US012141835B2

(12) United States Patent
Arai et al.

(10) Patent No.: US 12,141,835 B2
(45) Date of Patent: Nov. 12, 2024

(54) INFORMATION PROCESSING DEVICE, CONTROL METHOD, AND STORAGE MEDIUM

(71) Applicant: NEC Corporation, Tokyo (JP)

(72) Inventors: Kan Arai, Tokyo (JP); Kota Iwamoto, Tokyo (JP)

(73) Assignee: NEC CORPORATION, Tokyo (JP)

(*) Notice: Subject to any disclaimer, the term of this patent is extended or adjusted under 35 U.S.C. 154(b) by 280 days.

(21) Appl. No.: 17/767,566

(22) PCT Filed: Oct. 31, 2019

(86) PCT No.: PCT/JP2019/042806
§ 371 (c)(1),
(2) Date: Apr. 8, 2022

(87) PCT Pub. No.: WO2021/084688
PCT Pub. Date: May 6, 2021

(65) Prior Publication Data
US 2023/0186368 A1      Jun. 15, 2023

(51) Int. Cl.
*G06Q 30/0251*    (2023.01)
*B25J 11/00*        (2006.01)
*G06Q 30/0601*    (2023.01)

(52) U.S. Cl.
CPC ........ *G06Q 30/0252* (2013.01); *B25J 11/008* (2013.01); *G06Q 30/0261* (2013.01);
(Continued)

(58) Field of Classification Search
None
See application file for complete search history.

(56) References Cited

U.S. PATENT DOCUMENTS 7,598,695 B2 * 10/2009 Takanishi ............. B25J 19/0091
                                                             901/1
8,688,517 B2 *  4/2014 Lutnick ............... G07F 17/3223
                                                             705/14.1
(Continued)

FOREIGN PATENT DOCUMENTS

JP    2001-325523 A    11/2001
JP    2009-163431 A     7/2009
(Continued)

OTHER PUBLICATIONS

Navarro, A.S.P.H. et al., "Mobile robot vending machine for beaches based on consumer's preferences and multivariate methods, A," Procedia—Social and Behavioral Sciences, 175 (2015) 122-129. (Year: 2015).*

(Continued)

*Primary Examiner* — Nicholas D Rosen

(57) ABSTRACT

The information processing device 1D mainly includes a state-of-activity estimation unit 31D and a timing determination unit 32D. The state-of-activity estimation unit 31D estimates, based on information detected in a meeting room in which a meeting is being held, a state of activity of the meeting. The timing determination unit 32D determines a timing of mobile sales of a commodity to one or more participants of the meeting based on the state of activity estimated by the state-of-activity estimating unit 31D.

11 Claims, 14 Drawing Sheets

(52) U.S. Cl.
CPC ..... *G06Q 30/0251* (2013.01); *G06Q 30/0255* (2013.01); *G06Q 30/0631* (2013.01)

(56) References Cited

U.S. PATENT DOCUMENTS

| | | | |
|---|---|---|---|
| 9,584,836 B2* | 2/2017 | Fei | H04N 21/64322 |
| 9,643,779 B2* | 5/2017 | Yamada | B25J 5/007 |
| 9,747,236 B2* | 8/2017 | Corbin | H04L 69/16 |
| 9,769,368 B1* | 9/2017 | Morford | H04N 23/617 |
| 10,248,122 B2* | 4/2019 | Cronin | G05D 1/0088 |
| 10,373,226 B1* | 8/2019 | Russell | G06Q 30/0635 |
| 10,854,033 B2* | 12/2020 | Jafa | G07F 9/001 |
| 11,442,419 B2* | 9/2022 | Heinla | G06Q 10/00 |
| 2005/0237188 A1* | 10/2005 | Tani | G05D 1/0246 |
| | | | 340/541 |
| 2006/0100742 A1* | 5/2006 | Park | G05D 1/0253 |
| | | | 700/259 |
| 2008/0252247 A1* | 10/2008 | Takanishi | B62D 57/032 |
| | | | 901/1 |
| 2010/0211431 A1* | 8/2010 | Lutnick | G06Q 30/0269 |
| | | | 705/14.12 |
| 2012/0150586 A1* | 6/2012 | Harper | G06Q 30/0204 |
| | | | 705/7.33 |
| 2015/0274421 A1* | 10/2015 | Yamada | B25J 11/0005 |
| | | | 700/218 |
| 2016/0066041 A1* | 3/2016 | Fei | H04N 21/2668 |
| | | | 725/34 |
| 2016/0238403 A1* | 8/2016 | Brown | G01C 21/3632 |
| 2016/0299862 A1* | 10/2016 | Corbin | H04N 21/43635 |
| 2018/0011492 A1 | 1/2018 | Kajiyama et al. | |
| 2018/0060893 A1* | 3/2018 | Omer | G06Q 30/0201 |
| 2018/0246513 A1* | 8/2018 | Cronin | G07F 11/46 |
| 2019/0220061 A1* | 7/2019 | Fujimoto | G06F 1/16 |
| 2019/0228174 A1* | 7/2019 | Withrow | H04L 9/3213 |
| 2020/0005211 A1* | 1/2020 | Tsuji | A61B 5/1112 |
| 2020/0105085 A1* | 4/2020 | Jafa | G06Q 20/18 |
| 2020/0209821 A1* | 7/2020 | Heinla | G05B 19/4155 |
| 2023/0153886 A1* | 5/2023 | Arai | G06Q 30/0631 |
| | | | 705/26.7 |

FOREIGN PATENT DOCUMENTS

| | | | | |
|---|---|---|---|---|
| JP | 2018-005650 A | | 1/2018 | |
| JP | 2019-049785 A | | 3/2019 | |
| WO | WO-2019053162 A1 | * | 3/2019 | ........ G05B 19/042 |

OTHER PUBLICATIONS

Anon., "Tokyo-Mitsubishi to Introduce Humanoid Robot for Customer Service," Jiji Press English News Service [Tokyo] Feb. 2, 2015. (Year: 2015).*

Google machine translation of Otsuka, M., et al., "Consideration of the sweets presentation device 'Kansai-kun' that stimulates multi-person discussions," Entertainment Computing Symposium (EC2017), Sep. 2017; machine translation made on Mar. 1, 2024. (Year: 2024).*

International Search Report for PCT Application No. PCT/JP2019/042806, mailed on Jan. 28, 2020.

Otsuka et al., "Facilitation interface using snacks for activating multi-member discussion", IPSJ Interaction 2018, pp. 561-564.

* cited by examiner

FIG. 3

| LOCATION | TRIAL DATE & TIME | MEETING ELAPSED TIME | NUMBER OF PARTICIPANTS | SOUND VOLUME (dB) | | MOTION AMOUNT (1~5) | | ... | PRESENCE/ ABSENCE OF PURCHASE |
|---|---|---|---|---|---|---|---|---|---|
| | | | | BEFORE | AFTER | BEFORE | AFTER | | |
| MEETING ROOM A | 2019.9.14 14:00 | 60MIN | 5 | 21dB | 40dB | 1 | 2 | ... | PRESENCE |
| MEETING ROOM D | 2019.9.14 14:05 | 35MIN | 2 | 15dB | 30dB | 2 | 4 | ... | PRESENCE |
| MEETING ROOM B | 2019.9.14 14:15 | 15MIN | 8 | 35dB | 36dB | 2 | 2 | ... | ABSENCE |
| ... | ... | ... | ... | ... | ... | ... | ... | ... | ... |

| LOCATION | RESERVATION 1 | | ... | RESERVATION 2 | | ... | ... |
|---|---|---|---|---|---|---|---|
| | TIME SLOT | NUMBER OF PARTICIPANTS | | TIME SLOT | NUMBER OF PARTICIPANTS | | |
| MEETING ROOM A | 2019. 9.14 13:00~15:00 | 5 | ... | 2019. 9.14 15:00~17:00 | 3 | ... | ... |
| MEETING ROOM B | 2019. 9.14 12:00~13:00 | 3 | ... | 2019. 9.14 13:30~15:00 | 8 | ... | ... |
| MEETING ROOM C | 2019. 9.14 14:00~15:00 | 6 | ... | 2019. 9.14 16:00~17:00 | 7 | ... | ... |
| ... | ... | ... | ... | ... | ... | ... | ... |

FIG. 8
100A: COMMODITY SALES SYSTEM
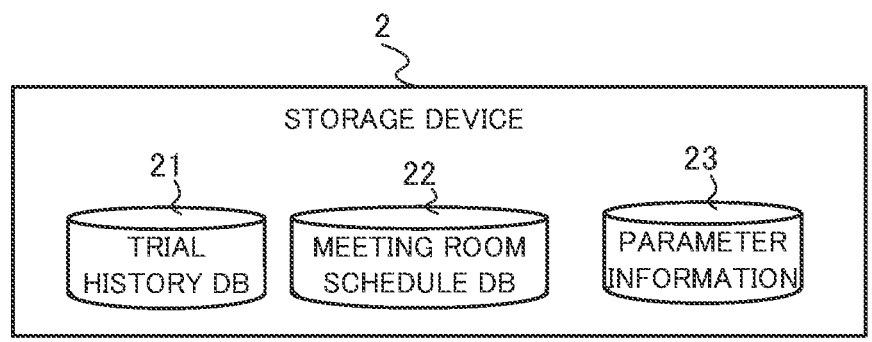
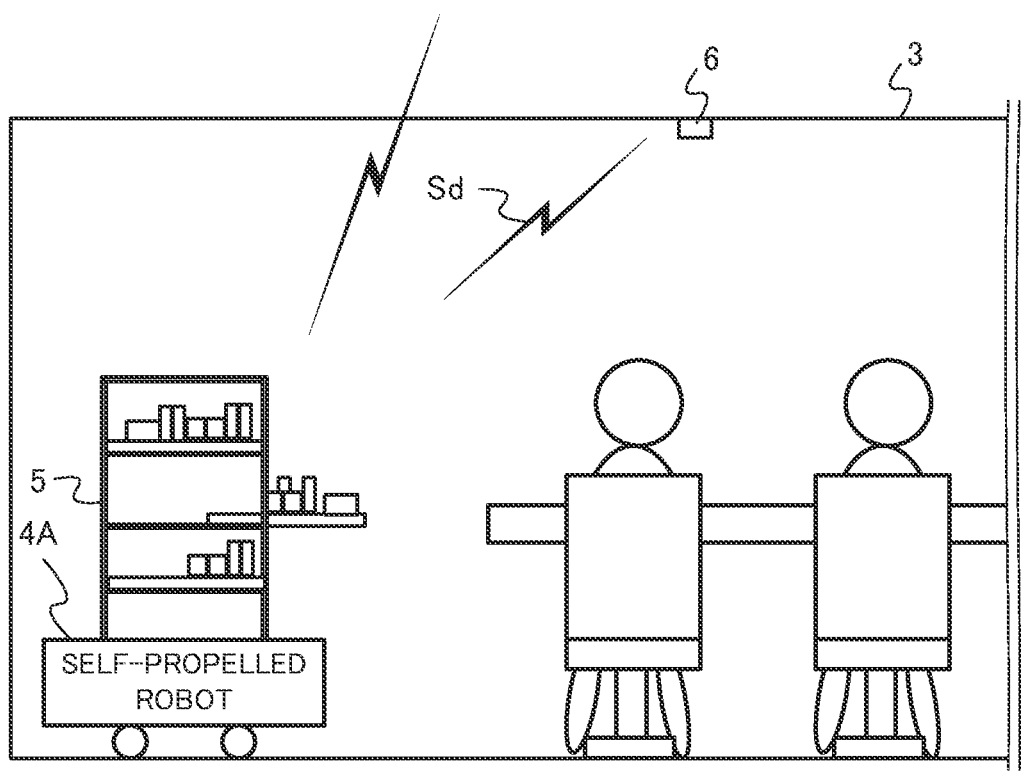

| LOCATION | RESERVATION 1 | | | | RESERVATION 2 | | | | |
|---|---|---|---|---|---|---|---|---|---|
| | TIME SLOT | NUMBER OF PARTICIPANTS | PARTICIPANT ID-1 | ... | TIME SLOT | NUMBER OF PARTICIPANTS | PARTICIPANT ID-1 | ... | ... |
| MEETING ROOM A | 2019. 9.14 13:00~15:00 | 5 | xxxxx | ... | 2019. 9.14 15:00~17:00 | 3 | vvvvv | ... | ... |
| MEETING ROOM B | 2019. 9.14 12:00~13:00 | 3 | yyyyy | ... | 2019. 9.14 13:30~15:00 | 8 | wwwww | ... | ... |
| MEETING ROOM C | 2019. 9.14 14:00~15:00 | 6 | zzzzz | ... | 2019. 9.14 16:00~17:00 | 7 | sssss | ... | ... |
| ... | ... | ... | ... | ... | ... | ... | ... | ... | ... |

INFORMATION PROCESSING DEVICE, CONTROL METHOD, AND STORAGE MEDIUM

This application is a National Stage Entry of PCT/JP2019/042806 filed on Oct. 31, 2019, the contents of all of which are incorporated herein by reference, in their entirety.

TECHNICAL FIELD

The present invention relates to a technical field of an information processing device, a control method, and a storage medium for performing processing related to commodity sales.

BACKGROUND ART

An approach for deciding an commodity to be recommended to customers based on information such as attributes and purchase results for each customer has been proposed. For example, Patent Literature 1 discloses an approach for listing sales target commodities for individual customers based on customer information such as a customer identifier, a customer name, a customer address, a customer age, and a customer family configuration. Further, Patent Literature 2 discloses an autonomous mobile robot which autonomously moves toward a customer who visits the building and which proposes commodity information to the customer.

CITATION LIST

Patent Literature

Patent Literature 1: JP 2001-325523A
Patent Literature 2: JP 2019-049785A

SUMMARY

Problem to be Solved

Even when a commodity which the customer wants is predicted, the customer ends up not purchasing the commodity if the commodity is not provided at such a timing that the customer wants the commodity. This could lead to a loss of sales opportunities. Further, in both of Patent Literature 1 and Patent Literature 2, there is no disclosure and suggestion about the mobile sales to a meeting room where the meeting is held.

In view of the above-described issue, it is therefore an example object of the present disclosure to provide an information processing device, a control method and a storage medium suitable for commodity sales to a meeting room.

Means for Solving the Problem

In one mode of the information processing device, there is provided an information processing device including: an information processing device including: a state-of-activity estimation unit configured to estimate, based on information detected in a meeting room in which a meeting is being held, a state of activity of the meeting; and a timing determination unit configured to determine a timing of mobile sales of a commodity to one or more participants of the meeting based on the state of activity.

In one mode of the control method, there is provided a control method executed by an information processing device, the control method including: estimating, based on information detected in a meeting room in which a meeting is being held, a state of activity of the meeting; and determining a timing of mobile sales of a commodity to one or more participants of the meeting based on the state of activity.

In one mode of the storage medium, there is provided a storage medium storing a program executed by a computer, the program causing the computer to function as: a state-of-activity estimation unit configured to estimate, based on information detected in a meeting room in which a meeting is being held, a state of activity of the meeting; and a timing determination unit configured to determine a timing of mobile sales of a commodity to one or more participants of the meeting based on the state of activity.

Effect

An example advantage according to the present invention is to suitably determine the timing of performing the mobile sales of a commodity to the meeting room at an appropriate timing based on the state of the activity in the meeting, thereby to suitably perform the commodity sales in the meeting room.

BRIEF DESCRIPTION OF THE DRAWINGS

FIG. 3 is an example of the data structure of trial history database (DB).

FIG. 4 is an example of the data structure of meeting room schedule DB.

FIG. 8 illustrates a schematic configuration of a commodity sales system according to a modification.

FIG. 12 is an example of the data structure of the meeting room schedule DB according to the second example embodiment.

EXAMPLE EMBODIMENTS

Hereinafter, example embodiments of an information processing device, a control method, and a storage medium will be described with reference to the drawings.

First Example Embodiment

(1) System Configuration

Figure 1:
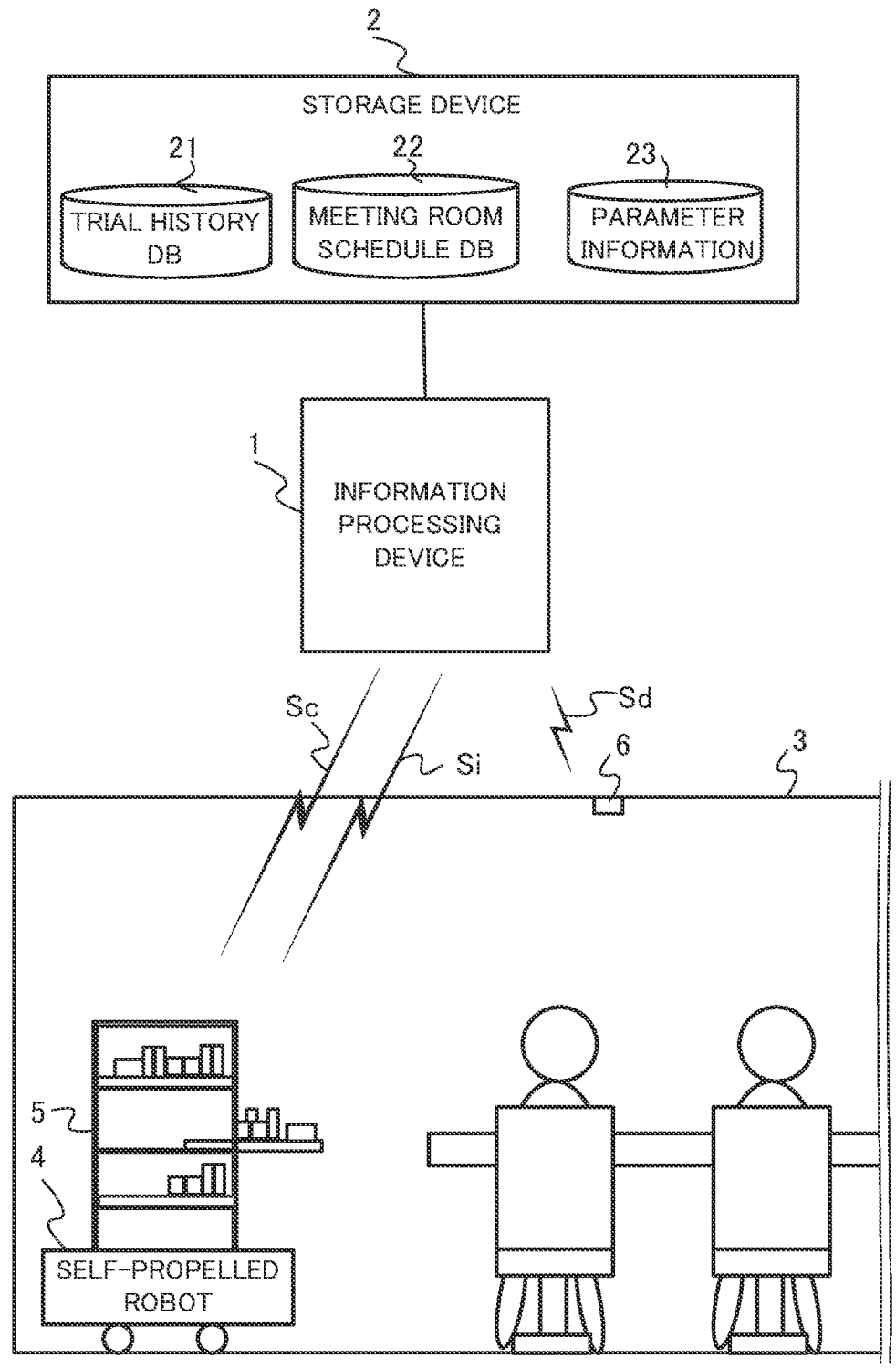
FIG. 1 illustrates a block configuration of a commodity sales system.

FIG. 1 shows a configuration of a commodity sales system 100 according to a first example embodiment. The commodity sales system 100 is a system for selling commodities (goods) to one or more participants (also referred to as "meeting participants") of a meeting (conference) in the meeting room 3. The commodity sales system 100 mainly includes an information processing device 1, a storage device 2, and a self-propelled robot 4 for performing mobile sales of commodities to the meeting room 3 by moving autonomously. Further, in the meeting room 3, there are provided one or more state detection sensors 6 for detecting the state (i.e. state of excitement) of activity of the meeting in the meeting room 3. The meeting room 3 may be any space in which a meeting is held, and may be, for example, an indoor open meeting space which is not surrounded by walls.

The information processing device 1 refers to the information stored in the storage device 2 to thereby generate a control signal "Sc" relating to an instruction of commodity sales to the self-propelled robot 4, and transmits the control signal Sc to the self-propelled robot 4. In this case, on the basis of the detection signal "Sd" received from the state detection sensor 6, the information processing device 1 estimates the state of activity in the meeting being held in the meeting room 3, and then, on the basis of the estimated state of the activity, the timing (also referred to as "sales timing") of performing the mobile sales to the meeting participants. Then, the information processing device 1 transmits to the self-propelled robot 4 a control signal Sc relating to an instruction of the mobile sales based on the determined sales timing. Further, the information processing device 1 receives from the self-propelled robot 4 a notification signal "Si" which is a signal for notifying the information processing device 1 of the state of the self-propelled robot 4 and the like.

The storage device 2 stores information necessary for the information processing device 1 to determine the sales timing to the meeting room 3 by the self-propelled robot 4. The storage device 2 includes a trial history database (DB) 21, a meeting room schedule DB 22, and parameter information 23.

The trial history DB 21 is a data base indicative of the history of trial results of mobile sales by the self-propelled robot 4. The meeting room schedule DB 22 is a database indicative of the schedule based on the reservation of meeting rooms 3 where the mobile sales is performed by the self-propelled robot 4. The parameter information 23 indicates the parameters used by the information processing device 1 in determining the sales timing. The specific examples of the data structures of the trial history DB 21 and the meeting room schedule DB 22 will be described later with reference to FIGS. 3 and 4, respectively.

The storage device 2 may be an external storage device such as a hard disk connected to or built in to the information processing device 1, or may be a storage medium such as a flash memory that is detachable from the information processing device 1. The storage device 2 may be configured by one or more server devices that perform data communication with the information processing device 1. The database or the like stored in the storage device 2 may be distributed and stored by a plurality of devices or storage media.

The self-propelled robot 4 autonomously moves inside a building including the meeting room 3, based on the control signal Sc transmitted from the information processing device 1, and performs the mobile sales of commodities to the meeting participants. In this case, on the basis of the control signal Sc, the self-propelled robot 4 approaches a meeting participant in the meeting room 3 and prompt the purchase of the commodities according to the sales timing determined by the information processing device 1. In this case, for example, the self-propelled robot 4 detects the presence of a meeting participant (i.e., recognizes a person present in the meeting room 3) based on own equipped sensors, and approaches the detected meeting participant to perform a predetermined action, thereby encouraging the meeting participant to purchase the commodities. In this case, the self-propelled robot 4 may approach all meeting participants in sequence and prompt the purchase of the commodities, or may prompt the purchase of the commodities to any one of the meeting participants, or may prompt the purchase of the commodities to only a meeting participant who addresses the self-propelled robot 4. For example, in a case where the self-propelled robot 4 recognizes a person present in the meeting room 3, the self-propelled robot 4 inputs the image outputted by the camera equipped with itself to an identifier learned in advance by any machine learning such as deep learning to detect the area of the person. Then, on the basis of the output by the identifier, the self-propelled robot 4 detects a person present in the meeting room 3 and sells the commodities to the detected person. In addition, the self-propelled robot 4 may detect a meeting participant based on any method used as a person detection method.

Further, in such a case that the self-propelled robot 4 waits outside the meeting room 3 by the time of the sales timing to the meeting room 3, the self-propelled robot 4 may have various functions for moving into the meeting room 3 at the sales timing in the meeting room 3. For example, the self-propelled robot 4 may have a function of opening the door (manual door or automatic door) of the meeting room 3, a function of knocking the door of the meeting room 3, and a function of outputting a predetermined sound for requesting a person in the surrounding or a person in the meeting room 3 to open the door of the meeting room 3. For example, the self-propelled robot 4 may have a function of transmitting a signal instructing the control device for controlling the opening and closing of the door of the meeting room 3 to open the door, as a function of opening the door of the meeting room 3.

Further, the self-propelled robot 4 includes a commodity holding unit 5 for accommodating the commodities to be sold. In FIG. 1, as an example, the commodity holding unit 5 is configured as a part of the self-propelled robot 4, and a plate of the shelf of the commodity holding unit 5 is configured to slide forward by the drive system of the self-propelled robot 4. In this case, as an example of the commodity recommendation method to be executed when arriving in the vicinity of the meeting participant, the self-propelled robot 4 performs control so that the plate on which the commodities are placed moves forward. In this case, the self-propelled robot 4 may, for example, recognize an attribute of the meeting participants such as the age and the gender based on a sensor such as a camera, and recommend a commodity according to the recognized attribute. In this case, for example, in order to determine the plate to be slid, the self-propelled robot 4 recognizes the position of each commodity in the commodity holding unit 5 based on a sensor such as a camera and a RFID reader provided in the commodity holding unit 5 and thereby recognizes the position of the commodity to be recommended to the target meeting participant. Further, in this case, the self-propelled robot 4 stores in advance information in which a commodity to be recommended is associated with each attribute of the meeting participant and refers to the information to determine the commodity to be recommended to the meeting participant.

The executable manner in which the self-propelled robot 4 prompts the commodity sale is not limited to the manner in which the plate of the commodity holding unit 5 is slid forward. For example, the self-propelled robot 4 may prompt the purchase of the commodity by: passing through the vicinity of the meeting participant; decelerating in the vicinity of the meeting participant; stopping for a predetermined time in the vicinity of the meeting participant; displaying or outputting by audio information prompting the purchase of the commodity; illuminating a lamp or the like; or a combination thereof. Further, the self-propelled robot 4 may, for example, recognize the attribute of the meeting participant such as the age and the gender based on a sensor such as a camera, and prompt the purchase of the commodity in a manner according to the recognized attribute. In this case, the self-propelled robot 4 previously stores information in which the manner of prompting the purchase of the commodity to be performed is associated with each attribute of the meeting participant and refers to the above information to thereby determine the manner of prompting the meeting participant to purchase the commodity.

In addition, the self-propelled robot 4 also carries out a paying procedure when the meeting participant purchase a commodity. Further, the self-propelled robot 4 transmits a notification signal Si indicative of the present state of the self-propelled robot 4, the trial result of the commodity sales, and the like to the information processing device 1 at a predetermined timing.

The self-propelled robot 4 may have a standby place outside the meeting room 3 and perform the commodity sales by entering the meeting room 3 in accordance with the sales timing specified by the control signal Sc. In another example, the self-propelled robot 4 may have a standby place inside the meeting room 3 and perform the commodity sales by moving inside the meeting room 3 in accordance with the sales timing specified by the control signal Sc.

The state detection sensor 6 is one or more sensors provided in the meeting room 3 and it is used for detecting the state of activity of the meeting in the meeting room 3. Examples of the state detection sensor 6 include a camera for generating an image obtained by photographing a meeting participant in the meeting room 3, and a microphone for converting the sound in the meeting room 3 to an electric signal. If there is a screen for the projector in the meeting room 3, the state detection sensor 6 may include a camera including the screen in the photographing range. The state detection sensor 6 supplies the generated detection signal Sd to the information processing device 1.

The configuration of the commodity sales system 100 shown in FIG. 1 is an example, and various changes may be performed to the configuration. For example, the self-propelled robot 4 may perform mobile sales for plural meeting rooms 3. In this case, the information processing device 1 detects the state of activity or the like of each meeting room 3 and transmits the control signal Sc specifying a meeting room 3 for mobile sales to the self-propelled robot 4. In another example, plural self-propelled robots 4 may receive the control signal Sc transmitted by the information processing device 1. In this case, for each of the self-propelled robots 4, the meeting room 3 where the self-propelled robots 4 is in charge is defined, and the information processing device 1 transmits the control signal Sc indicative of the sales timing to the self-propelled robot 4 in charge of the target meeting room 3 of the sales timing determined by the information processing device 1. Further, in this case, each of the self-propelled robots 4 receives the control signal Sc from the information processing device 1, respectively, and performs mobile sales to the meeting room 3 at the sales timing specified by the received control signal Sc. Further, when there are a plurality of self-propelled robots 4, each of the self-propelled robots 4 may directly exchange data with other self-propelled robots 4. For example, when determining that communication with the information processing device 1 is impossible, the self-propelled robot 4 may share information by communicating with another self-propelled robot 4 that is within the communicable distance range. Further, the self-propelled robot 4 may exchange information relating to exchange of the meeting rooms 3 in charge and the like by communicating with another self-propelled robot 4 existing within the communicable distance range.

Further, the information processing device 1 may be configured by a plurality of devices. In this case, the plurality of devices constituting the information processing device 1 exchange information necessary for executing the pre-allocated processing with one another.

(2) Block Configuration

Figure 2A:
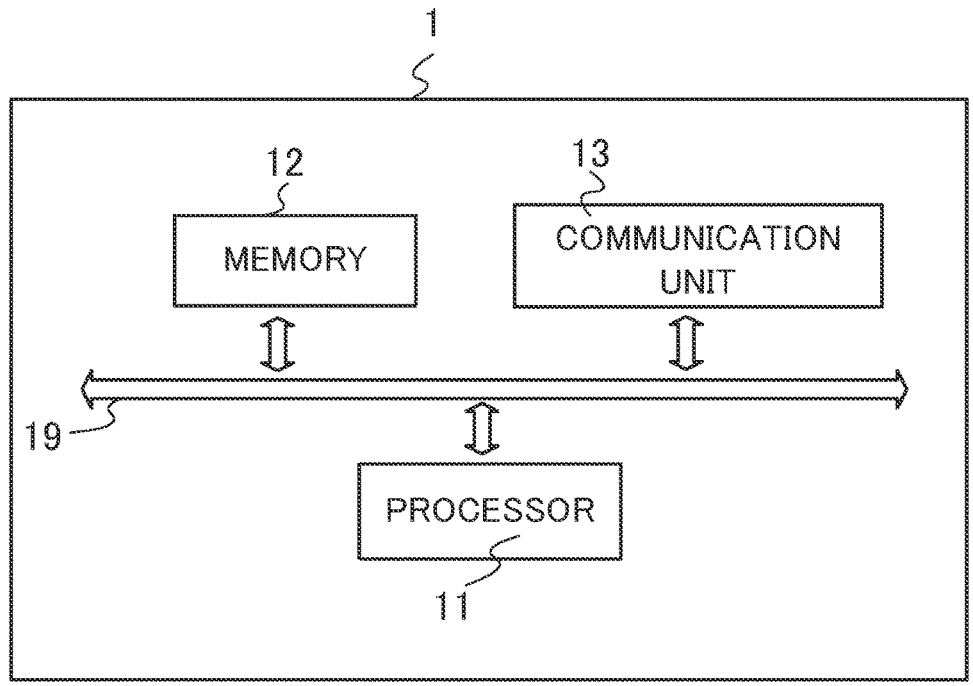
FIG. 2A illustrates a block configuration of an information processing device.

FIG. 2A shows an example of a block configuration of the information processing device 1. The information processing device 1 includes, as hardware, a processor 11, a memory 12, and a communication unit 13. The processor 11, the memory 12, and the communication unit 13 are connected via a data bus 19.

The processor 11 executes a predetermined process by executing a program stored in the memory 12. The processor 11 is one or more processors such as a CPU (Central Processing Unit) or a GPU (Graphics Processing Unit). The process executed by the processor 11 will be described in detail with reference to the functional block diagram indicated by FIG. 5.

The memory 12 is configured by various memories such as a RAM (Random Access Memory) and a ROM (Read Only Memory). In addition, a program for executing a predetermined process by the information processing device 1 is stored in the memory 12. The memory 12 is used as a work memory and temporarily stores information acquired from the storage device 2. The memory 12 may function as the storage device 2. Similarly, the storage device 2 may function as the memory 12 of the information processing device 1. The program executed by the information processing device 1 may be stored in a storage medium other than the memory 12.

The communication unit 13 is a communication interface for electrically connecting the information processing device 1 and other devices such as the storage device 2 and the self-propelled robot 4. For example, the communication unit 13 receives information registered in each database stored in the storage device 2 and transmits the update information of these databases by communicating with the storage device 2 under the control of the processor 11. Further, the communication unit 13, under the control of the processor 11, exchanges the control signal Sc and the notification signal Si with the self-propelled robot 4. Further, the communication unit 13 receives the detection signal Sd from the state detection sensor 6 such as a camera provided in the meeting room 3.

The configuration of the information processing device 1 is not limited to the configuration shown in FIG. 2A. For example, the information processing device 1 may be connected to or incorporate at least one of an input unit for receiving an input by a user, a display unit such as a display, and a sound output device such as a speaker. In this case, the information processing device 1 may be a tablet terminal or the like in which the input function and the output function are integrated with the main body.

Figure 2B:
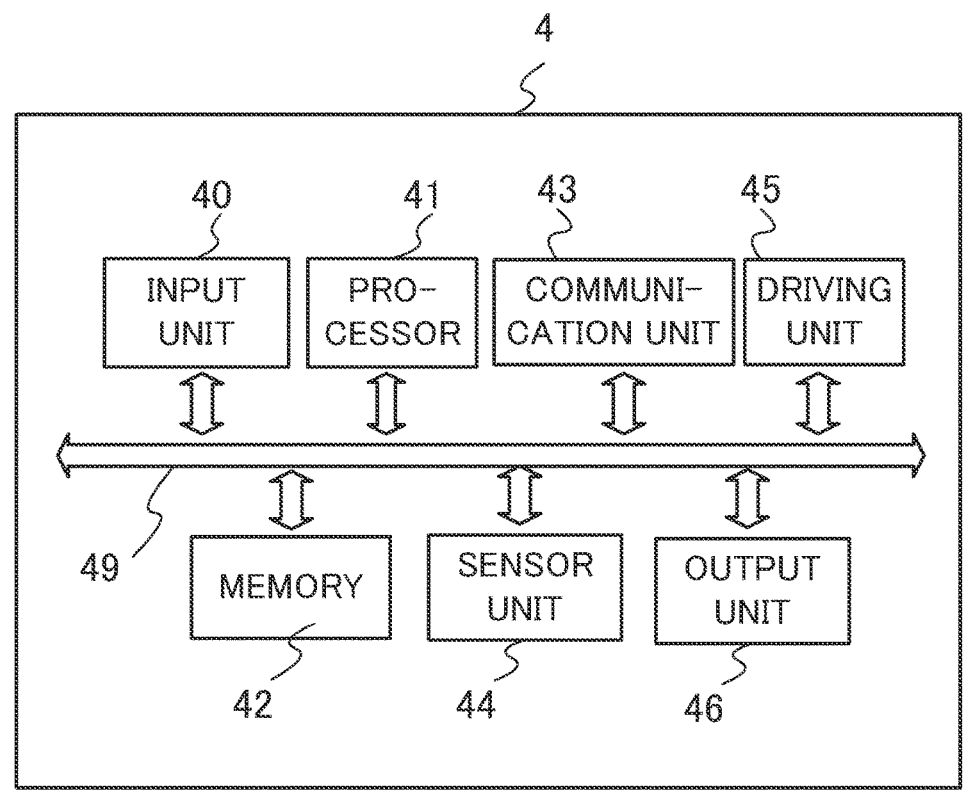
FIG. 2B illustrates a block configuration of a self-propelled robot.

FIG. 2B shows an example of the block configuration of the self-propelled robot 4. The self-propelled robot 4 includes, as hardware, an input unit 40, a processor 41, a memory 42, a communication unit 43, a sensor unit 44, a driving unit 45, and an output unit 46. The input unit 40, the processor 41, the memory 42, the communication unit 43, the sensor unit 44, the driving unit 45 and the output unit 46 are connected to one another via a data bus 49.

The input unit 40 is an interface for receiving an input from a meeting participant or a manager of the self-propelled robot 4, and examples of the input unit 40 include a button, a switch, a touch panel, and a voice input device.

The processor 41 executes a predetermined process by executing a program stored in the memory 42. The processor 41 is one or more processors such as a CPU, a GPU, and the like.

The memory 42 is configured by various memories such as RAM and ROM. Further, the memory 42 stores a program for the self-propelled robot 4 to execute a predetermined process. The memory 42 is also used as a working memory.

The communication unit 43 is a communication interface for the mobile robot 4 to communicate with other devices such as the information processing device 1 and the storage device 2. For example, under the control of the processor 41, the communication unit 43 exchanges the control signal Sc and the notification signal Si with the information processing device 1. Further, under the control of the processor 41, the communication unit 43 may receive, from the state detection sensor 6 provided in the meeting room 3 or each database stored in the storage device 2, information necessary for the processor 41 to control the driving unit 45 and the output unit 46.

The sensor unit 44 includes a variety of internal sensors and external sensors. Examples of the sensor unit 44 include a GPS receiver, an IMU (Inertial Measurement Unit), and camera, a laser range scanner, and other variety of sensors used in a self-position estimation, an obstacle detection, a person detection or a person authentication, and the like.

The driving unit 45 is a drive system that is driven under the control of the processor 41, and includes a drive system related to the traveling of the self-propelled robot 4, and a drive system related to the movement of commodities stored in the commodity holding unit 5 (including an arm for grasping a commodity and the like).

The output unit 46 outputs information under the control of the processor 41. The output unit 46 includes, for example, a sound output unit such as a speaker and a display unit such as a display.

The configuration of the self-propelled robot 4 is not limited to the structure shown in FIG. 2B, and may include any components that a self-propelled robot may have.

(3) Data Structure

FIG. 3 is an example of a data-structure of a trial history DB 21. The trial history DB 21 is a database indicative of the trial history (i.e., the result of the mobile sales performed in the past) of the mobile sales to meeting participants by the self-propelled robot 4, and has the following items: "LOCATION", "TRIAL DATE & TIME", "MEETING ELAPSED TIME", "NUMBER OF PARTICIPANTS", "SOUND VOLUME", "MOTION AMOUNT", and "PRESENCE/ABSENCE OF PURCHASE". In addition to the items described above, the trial history DB 21 may have any other item, such as an item of "PURCHASED COMMODITIES" for recording information indicating the contents of purchase (e.g., identification information of purchased commodities).

"LOCATION" indicates the meeting room 3 in which mobile sales by the self-propelled robot 4 was tried. "TRIAL DATE & TIME" indicates the date and time when the mobile sales by the self-propelled robot 4 was tried. "MEETING ELAPSED TIME" indicates the elapsed time since the start of the meeting as of the mobile sales trial by the self-propelled robot 4. "NUMBER OF PARTICIPANTS" indicates the number of participants in the meeting in the meeting room 3 in which mobile sales by the self-propelled robot 4 was tried. "SOUND VOLUME" indicates the sound volume detected in the meeting room 3 before and after the trial of mobile sales by the self-propelled robot 4. Here, the sub-item "BEFORE" of the item "SOUND VOLUME" indicates the sound volume detected before the trial of moving sales, and the sub-item "AFTER" indicates the volume detected after the trial of moving sales. "MOTION AMOUNT" indicates the level in five stages of the motion amount detected in the meeting room 3 before and after the trial of the mobile sales by the self-propelled robot 4. Here, the sub-item "BEFORE" of the item "MOTION AMOUNT" indicates the level of the motion amount detected before the trial of the moving sales, and the sub-item "AFTER" indicates the level of the motion amount detected after the trial of the moving sales. In the sub-items of "MOTION AMOUNT", any index value representing the motion amount other than the level of the motion amount may be recorded. In this way, in each item of "VOLUME" and "MOTION AMOUNT", information indicating the changes in the state of activity before and after the mobile sales is recorded. The item "PRESENCE/ABSENCE OF PURCHASE" indicates the presence/absence of purchase of commodities by the meeting participants when the mobile sales by the self-propelled robot 4 is tried.

Here, a specific example of updating the trial history DB 21 by the information processing device 1 will be described.

For example, each time the information processing device 1 receives from the mobile robot 4 the notification signal Si indicating the trial result of the mobile sales, the information processing device 1 generates a record to be registered in the trial history DB 21 on the basis of the notification signal Si and the detection signal Sd transmitted from the state detection sensor 6 during the target meeting. In this case, after the trial of the mobile sale of the commodities, the self-propelled robot 4 transmits to the information processing device 1 the notification signal Si which indicates: the date and time; the location where the trial of the mobile sale was performed; and information indicative of the presence or absence of the purchase as a trial result. Then, on the basis of the notification signal Si and the reservation information regarding the target meeting room 3 recorded in the meeting room schedule DB 22, the information processing device 1 determines the information to be registered in the items "LOCATION", "TRIAL DATE & TIME", "MEETING ELAPSED TIME", "NUMBER OF PARTICIPANTS", and "PRESENCE/ABSENCE OF PURCHASE".

Further, on the basis of the detection signal Sd indicating the sound signal generated by the microphone included in the state detection sensor 6, the information processing device 1 measures the sound volume before and after the trial mobile sales by the self-propelled robot 4.

In this case, for example, the information processing device 1 records the average value of the sound volume detected within a predetermined time (e.g., 5 minutes) immediately before the trial of the mobile sales by the self-propelled robot 4 in the sub-item "BEFORE" of the item "SOUND VOLUME". Further, the information processing device 1 records the average value of the volume detected within a predetermined time immediately after the trial of the mobile sales by the self-propelled robot 4 in the sub-item "AFTER" of the item "VOLUME". Similarly, on the basis of the detection signal Sd including the time series images generated by the camera included in the state detection sensor 6, the information processing device 1 calculates the motion amount before and after the trial mobile sales by the self-propelled robot 4. In this case, the information processing device 1 may use any index as the motion amount to be calculated. For example, the information processing device 1 calculates the average length of vectors indicating optical flow between the images or the average or the sum of differences in units of pixels between images as the motion amount between the images. Then, as with the sound volume, the information processing device 1 records, in the sub-items "BEFORE" and "AFTER" of the item "MOTION AMOUNT", each average of the motion amount detected respectively within a predetermined time immediately before and immediately after the trial of the mobile sales by the mobile robot 4. In the example of FIG. 3, as an example, the information processing device 1 records, in each sub-item described above, the level of the motion amount in five stages determined based on the index value of the calculated motion amount.

The data structure of the trial history DB 21 is not limited to the structure shown in FIG. 3. For example, the trial history DB 21 may store the time series information indicative of the sound volume and the motion amount during the entire meeting as the sound volume and the motion amount. Such time series information indicative of the volume and the motion amount may be used as a part of the training data to be used for learning of the parameter information 23. In other instances, the trial history DB 21 may include information (e.g., a level or index value indicating an state of activity) indicative of the state of activity estimated by the information processing device 1 in place of or in addition to the sound volume and motion amount. A method for estimating the state of activity will be described later. In addition, the trial history DB 21 may include various information to be used to learn the parameter information 23.

FIG. 4 is an example of a data structure of the meeting room scheduling DB 22. The meeting room schedule DB 22 shown in FIG. 4 is a database showing the reservation status of each meeting room. As shown in FIG. 4, the meeting room schedule DB 22 is associated with a plurality of reservation information indicating the reservation date and time and the number of participants for each meeting room. "TIME SLOT" refers to the reservation date and time slot and "NUMBER OF PARTICIPANTS" refers to the expected number of participants at the meeting room appointed at the time of reservation.

(4) Functional Block

Figure 5:
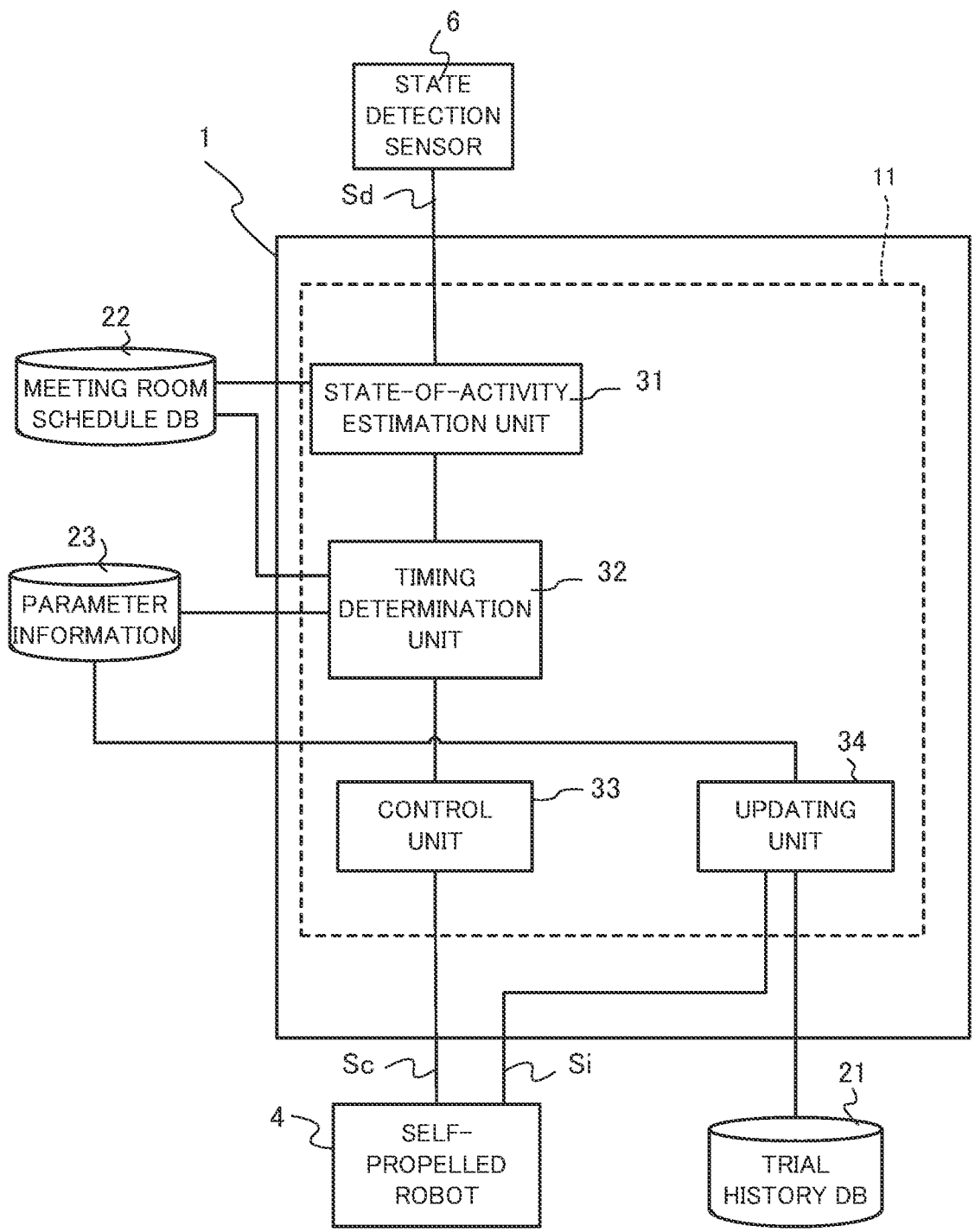
FIG. 5 is an example of a functional block of the processor of the information processing device.

FIG. 5 is an example of a functional block of the processor 11 of the information processing device 1. The processor 11 of the information processing device 1 functionally includes a state-of-activity estimation unit 31, a timing determination unit 32, a control unit 33, and an updating unit 34.

The state-of-activity estimation unit 31 identifies the meeting room 3 in the middle of the meeting by referring to the meeting room schedule DB 22, and estimates the state of activity of the meeting in the identified meeting room 3 based on the detection signal Sd supplied from the state detecting sensor 6 provided in the meeting room 3. For example, the state-of-activity estimation unit 31 estimates the level of the state of activity corresponding to the degree of activity of the current meeting. In this case, for example, there is a level of the state of activity corresponding to "stagnant state" indicating the stagnant state (inactivity state) of the meeting, "activated state" indicating the excited state (activated state) of the meeting, and one or more "intermediate states" corresponding to the state in between. In another example, the state-of-activity estimation unit 31 may calculate a predetermined index value representing an state of activity of the current meeting. Thereafter, it is assumed that the lower the level or the index of the estimated state of activity is, the more stagnant the meeting is.

Here, a specific example of a method of calculating the level or the index value of the state of activity described above will be described.

For example, the state-of-activity estimation unit 31 determines the level or index value of the state of activity, based on at least one of the sound volume and the motion amount in the meeting room 3 detected based on the detection signal Sd. For example, the state-of-activity estimation unit 31 stores, in the memory 12 or the storage device 2, a table or map in which the level or the index value of the state of activity corresponding to each possible combination of the sound volume and the motion amount to be detected is associated. Then, by referring to the table or map described above, the state-of-activity estimation unit 31 determines the current level or the current index value of the state of activity of the meeting from the detected sound volume and motion amount based on the detection signal Sd. In another example, the state-of-activity estimation unit 31 preliminarily stores, in the memory 12 or the storage device 2, the parameters of the model (inference model) learned to output the inference result of the state of activity when the sound volume and the motion amount are inputted thereto. Then, when the sound volume and the motion amount are detected based on the detection signal Sd, the state-of-activity estimation unit 31 inputs the detected sound volume and the motion amount to the learned inference model and acquires the level or the index value of the state of activity that is the inference result of the state of activity outputted from the inference model. In this case, the learning model described above may be a model based on deep learning or may be a model of any other machine learning, such as a support vector machine.

The target of measurement of the motion amount used for estimating the state of activity may be the entire image (i.e., the shooting range of the camera) acquired from the state detection sensor 6, or may be limited to a person in the image. In another example, the target of measurement of the motion amount may be a view of a meeting participant's computer projected on a screen provided in the meeting room 3, or may be a display screen area of the participant's computer. Generally, when a meeting is stagnant, there is decrease in the movement of the meeting participants (nodding, gesture, etc.), the movement of the display screen of the computer used by the meeting participants, or the movement of the view of the computer projected on the display screen. Therefore, the state-of-activity estimation unit 31 can preferably estimate the state of activity of the meeting by detecting the motion amount of at least one of the meeting participants, the view projected on the screen, or the display screen of the computer.

The timing determination unit 32 determines the sales timing based on the state of activity estimated by the state-of-activity estimation unit 31. In this case, for example, the timing determination unit 32 determines the sales timing if it determines that the current state of activity is a stagnant state, or that the current state is a state (simply referred to as a "precursor state") of precursor to the stagnant state. For example, if the timing determination unit 32 determines that current state of activity is the stagnant state, the timing determination unit 32 determines that the current timing is the sales timing. If the timing determination unit 32 determines that the current state of activity is the precursor state, the timing determination unit 32 determines that the time after a predetermined time from the present is the sales timing. In this case, the timing determination unit 32 may set the above-described predetermined time to a time length previously stored in the storage device 2 or the memory 12 or the like, or to a time length determined based on the meeting elapsed time as of present or/and the remaining time to the end of the meeting.

Here, for example, the timing determination unit 32 determines that the current state of activity is the stagnant state if the level or the index value of the state of activity estimated by the state-of-activity estimation unit 31 is equal to or less than a predetermined threshold value. Further, for example, the timing determination unit 32 determines that the current state of activity is the precursor state to shift to the stagnant state, if the level or the index value of the estimated state of activity is larger than the threshold value described above and there is continuous downward trend in the level or the index value of the state of activity for a predetermined threshold time or more. The timing determination unit 32 may predict the stagnant state by using a prediction method such as an arbitrary regression analysis for the transition of the estimated state of activity from the start of the meeting, and may determine that the present state of activity is the precursor state when the stagnant state is predicted. In this case, the timing determination unit 32 may determine the sales timing to be the predicted time at which the stagnant state is predicted to occur.

In this way, by determining the sales timing of the self-propelled robot 4 in accordance with the stagnant state of the meeting, the timing determination unit 32 can suitably promote the commodity purchase in the mobile sales. Further, by performing the sales by the self-propelled robot 4 when the meeting is stagnant, it is possible to perform the mobile sales without disturbing the meeting and it can also be expected that the effect of providing a trigger to escape the stagnant state of the meeting.

In some embodiments, the timing determination unit 32 may further consider at least one of the meeting elapsed time and the number of participants of the meeting specified by referring to the meeting room schedule DB 22 to determine the sales timing. Generally, the longer the meeting elapsed time is, the more the participants require a rest. Thus, for example, if the meeting elapsed time becomes a predetermined time or more, the timing determination unit 32 changes the threshold or the like to be used for determination of the stagnant state or the precursor state. Specifically, the timing determination unit 32 shifts the above-described threshold or the like by a predetermined value or a predetermined rate to a direction in which the current state of activity is more easily determined to fall under the stagnant state or precursor state. In another example, the timing determination unit 32 considers that the state of activity estimated by the state-of-activity estimation unit 31 tends to be presumed to be a state having a higher degree of activity as the number of participants increases. Therefore, in this case, with increasing number of participants, the timing determination unit 32 shift the threshold or the like to be used for determination of the stagnant state or precursor state to a direction in which the current state of activity is more difficultly determined to fall under the stagnant state or precursor state. For example, on the assumption that the state of activity is estimated by the level of the five stages, if the number of participants in the meeting is three or less, the timing determination unit 32 sets the threshold value for the level of the state of activity to be determined to be the stagnant state as "2". In contrasts, if the number of participants is four or more, the timing determination unit 32 sets the above-described threshold value as "1".

Further, by referring to the parameter information 23, the timing determination unit 32 determines the sales timing. Here, the parameter information 23 may be various thresholds or the like to be used for the determination of the above-described stagnant state or the precursor state, or may be a parameter of the inference model configured to infer the sales timing based on the estimated state of activity. In the latter case, for example, the inference model is a learning model that is learned to output: information on whether or not the present time is the sales timing; or the time length until the sales timing (or the meeting elapsed time until the sales timing), when the state of activity, the number of participants, and the meeting elapsed time is inputted thereto. In this case, the learning model described above may be a model based on deep learning or may be a model of any other machine learning model, such as a support vector machine. In this case, the timing determination unit 32 can suitably determine the sales timing by inputting the information on the estimated state of activity, the number of meeting participants, and the meeting elapsed time to the inference model configured by the parameter information 23. The parameter information 23 may be prepared for each meeting room.

The control unit 33 generates a control signal Sc that specifies the sales timing determined by the timing determination unit 32 and the meeting room 3 or the like to be subjected to mobile sales at the sales timing, and supplies the control signal Sc to the self-propelled robot 4 by the communication unit 13. In this case, if the present time is the sales timing determined by the timing determination unit 32, the control unit 33 transmits to the self-propelled robot 4 the control signal Sc indicating that the mobile sales to the target meeting room 3 should be started immediately. In another example, if the sales timing determined by the timing determination unit 32 is after a predetermined time, the control unit 33 transmits to the self-propelled robot 4 a control signal Sc indicating that the mobile sales to the target meeting room 3 should be started after the predetermined time.

The updating unit 34 updates the trial history DB 21 based on the notification signal Si. Specifically, each time the updating unit 34 receives the notification signal Si indicating the trial result of the mobile sales from the mobile robot 4, the updating unit 34 generates a record to be registered in the trial history DB 21 on the basis of the notification signal Si and the detection signal Sd transmitted from the state detecting sensor 6 during the meeting in the meeting room 3. In this case, for example, on the basis of the notification signal Si and the reservation information of the meeting room 3 recorded in the meeting room schedule DB 22, the information processing device 1 recognizes the location of mobile sales, the trial date and time, the meeting elapsed time, the number of participants, and presence/absence of the purchase. Further, on the basis of the detection signal Sd, the information processing device 1 recognizes the sound volume and the motion amount before and after the trial of the mobile sales by the self-propelled robot 4. The information processing device 1 may calculate the meeting elapsed time at the time of the mobile sales and the number of meeting participants, based on the detection signal Sd.

Further, by referring to the trial history DB 21, the updating unit 34 updates the parameter information 23 to be used to determine the sales timing. In this case, for example, the updating unit 34 updates the parameter information 23 by performing machine learning using a record in which "PRESENCE/ABSENCE OF PURCHASE" is "PRESENCE" in the trial history DB 21 shown in FIG. 3 as training data indicating a success sample. The machine learning to be used in this case may be deep learning, or may be a support vector machine, or may be any other machine learning. It is noted that that the updating unit 34 may also use the record of the trial history DB 21 whose "PRESENCE/ABSENCE OF PURCHASE" is "ABSENCE" as the training data indicating a failure sample in the machine learning.

In this way, the updating unit 34 determines the training data serving as a success sample based on the presence/absence of the purchase. Thereby, the updating unit 34 can suitably update the parameter information 23 so that the timing determination unit 32 determines the sales timing to be an easy-to-purchase timing (timing when a customer tends to purchase).

In another example, the updating unit 34 may update the parameter information 23 by performing machine learning using, as the training data indicating a success sample, a record of the trial history DB 21 corresponding to the case in which the state of activity is estimated to have risen after the mobile sales (i.e., the meeting is activated). In this case, for example, the updating unit 34 uses, as the training data indicating a success sample, the record of the trial history DB 21 in which the level or index value of the state of activity estimated from the sound volume and the motion amount after the moving sales trial is larger than the level or index value of the state of activity estimated from the sound volume and the motion amount before the moving sales trial. In another example, the updating unit 34 uses, as the training data indicating a success sample, the record of the trial history DB 21 in which at least one of the sound volume and the motion amount after the trial of the mobile sales recorded in the trial history DB 21 is a predetermined threshold or more larger than the sound volume and the motion amount before the trial of the mobile sales.

In this way, by determining the training data indicating a success sample based on the presence/absence of an increase in the state of activity, the updating unit 34 can suitably update the parameter information 23 so that the timing determination unit 32 determines the sales timing to be the timing at which the meeting is likely to be activated.

(5) Processing Flow

Figure 6:
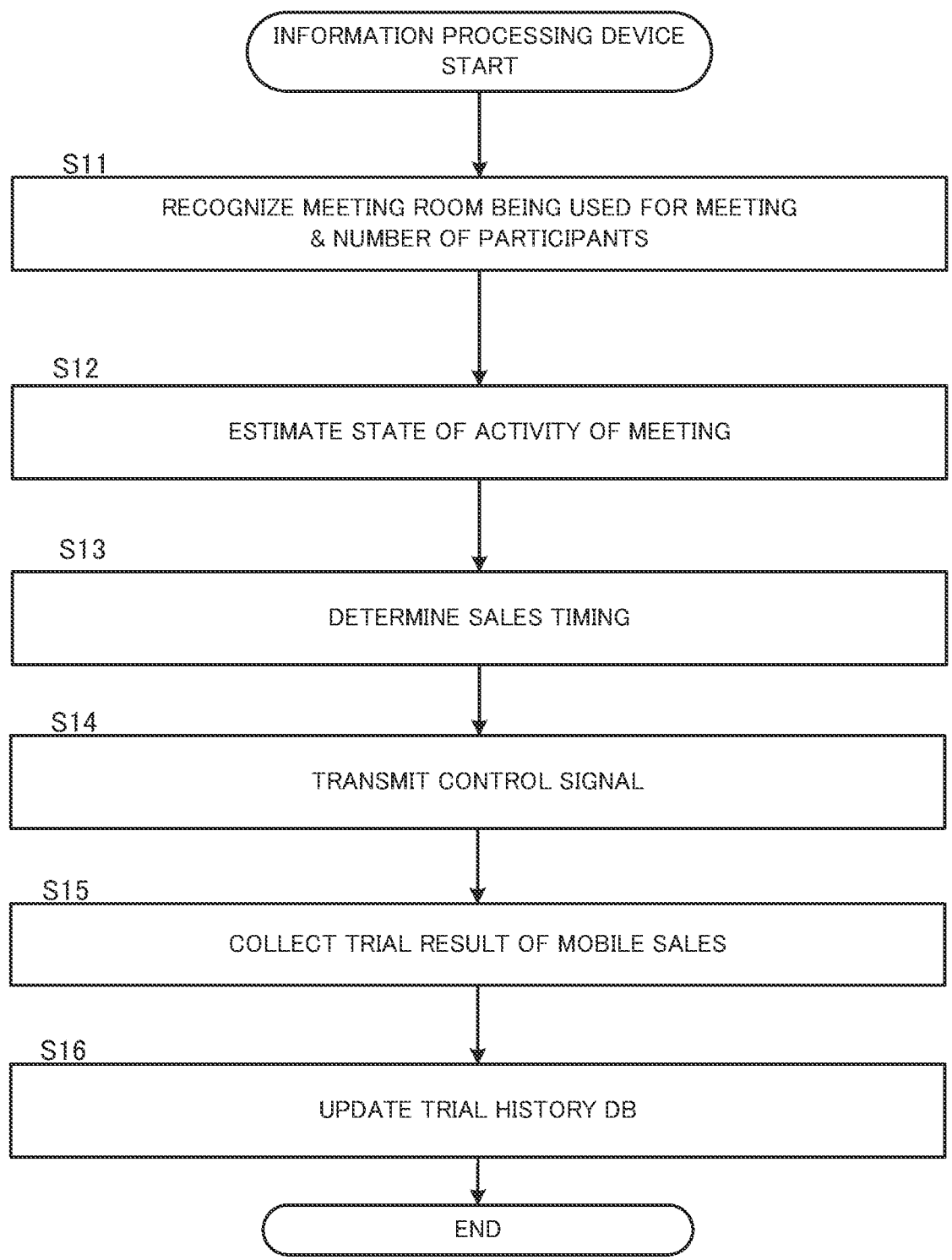
FIG. 6 is an example of a flowchart showing a processing procedure executed by the information processing device according to a first example embodiment.

FIG. 6 is an example of a flowchart showing a processing procedure executed by the information processing device 1 according to the first example embodiment.

First, the state-of-activity estimation unit 31 of the information processing device 1 recognizes the meeting room 3 at which a meeting is held and the number of participants in the meeting room 3 by referring to the meeting room schedule DB 22 (step S11). The state-of-activity estimation unit 31 may recognizes the meeting room 3 during a meeting and the number of participants in the meeting room 3, in addition to or in place of referring to the meeting room schedule DB 22, based on the detection signal Sd outputted by the state detecting sensor 6. The detection signal Sd used in this case is, for example, at least one of an image or audio data taken in the meeting room 3. Accordingly, the state of activity estimation unit 31 can accurately recognize the actual number of participants in the meeting and the time slot where the meeting is held, even when there is a change in the number of participants designated at the time of reservation of the target meeting room 3 and the time slot where the meeting is held.

Then, the state-of-activity estimation unit 31 estimates the state of activity of the meeting in the target meeting room 3 (step S12). For example, the state-of-activity estimation unit 31 estimates the above-described state of activity based on at least one of the sound volume or motion amount detected based on the detection signal Sd supplied from the state detection sensor 6 provided in the target meeting room 3.

Next, the timing determination unit 32 determines the sales timing based on the state of activity estimated by the state-of-activity estimation unit 31 (step S13). In the first example, at step S13, the timing determination unit 32 determines whether or not the current state of activity has become either a stagnant state or a precursor state thereof, and repeatedly executes step S12 and step S13 at predetermined time intervals until the current state of activity becomes a stagnant state or a precursor state thereof. Then, if the timing determination unit 32 determines that the current state of activity become a stagnant state or a precursor state of the stagnant state, the timing determination unit 32 determines the sales timing to be the present time or the time after a lapse of a predetermined time. In the second example, after a lapse of a predetermined time (e.g., after 30 minutes) since the start of the meeting, the timing determination unit 32 estimates the timing at which the stagnation state occurs based on the transition of the state of activity estimated at step S12 during the period from the start of the meeting to the present time, and determines the sales timing to be the estimated timing. Further, in the first or the second examples, the timing determination unit 32 may determine the sales timing by further considering at least one of the number of participants in the meeting and the meeting elapsed time in addition to the state of activity.

Then, the control unit 33 generates the control signal Sc for specifying the sales timing and the meeting room 3 subjected to mobile sales determined by the timing determination unit 32, and transmits it to the self-propelled robot 4 by the communication unit 13 (step S14). Thereafter, the self-propelled robot 4 which has received the control signal Sc sells the commodities in the meeting room 3 at the sales timing specified by the control signal Sc.

Next, the updating unit 34 collects the trial result of the mobile sales by the self-propelled robot 4 (step S15). Specifically, the updating unit 34 receives, from the self-propelled robot 4 via the communication unit 13, the notification signal Si including the trial result (such as the presence/absence of purchase of commodities) of the mobile sales by the self-propelled robot 4. The notification signal Si may include information indicating the execution date and time (i.e., execution timing) of the performed mobile sales.

Next, the updating unit 34 updates the trial history DB 21 based on: the notification signal Si acquired at step S15; the reservation information of the meeting room 3 included in the meeting room schedule DB 22; and the detection signal Sd generated during the meeting (step S16). Further, the updating unit 34 updates the parameter information 23 by training using the trial history DB 21 as the training data.

Figure 7:
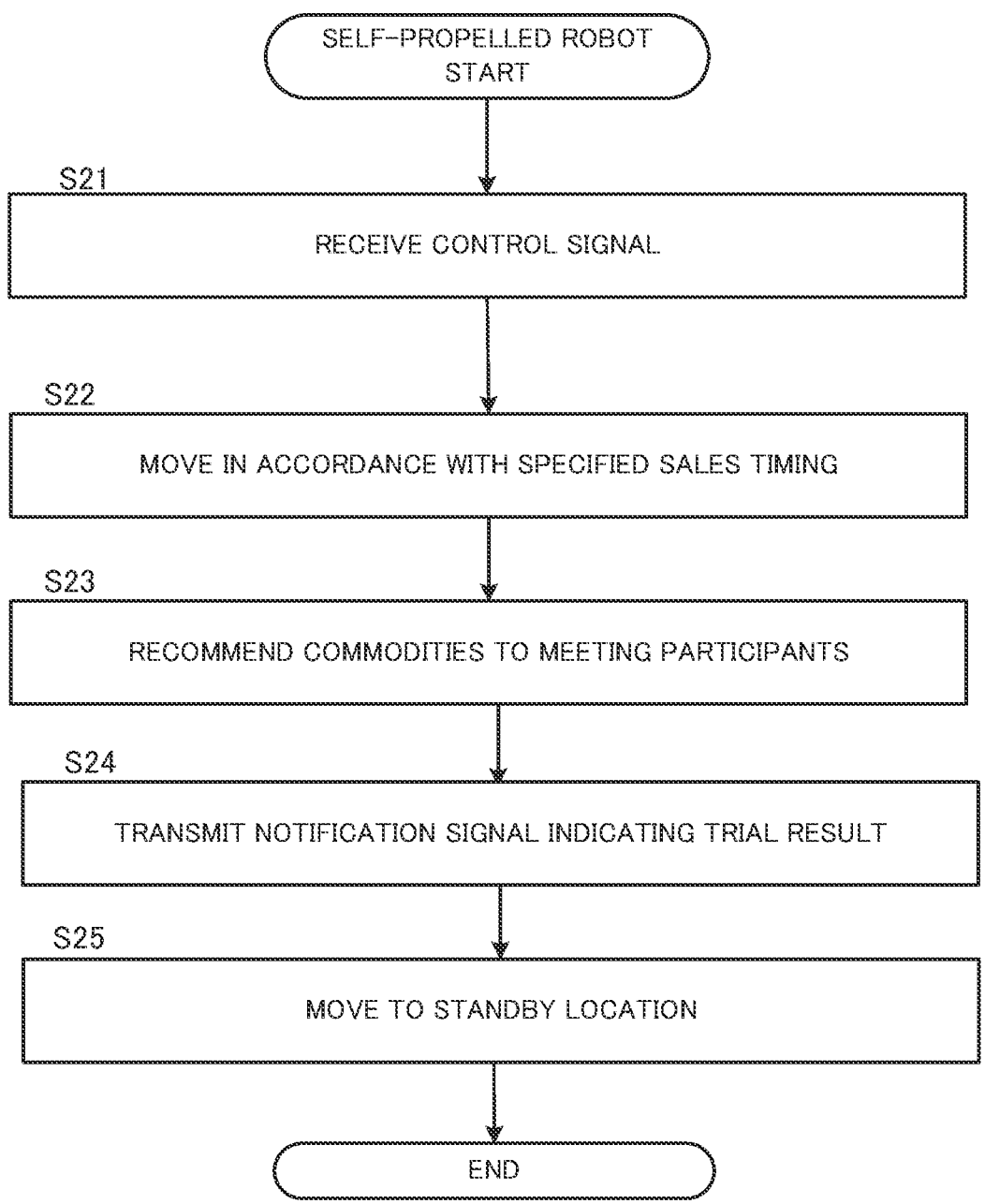
FIG. 7 is an example of a flowchart showing a processing procedure executed by the self-propelled robot according to the first example embodiment.

FIG. 7 is an example of a flowchart illustrating a processing procedure to be executed by the self-propelled robot 4 according to the first example embodiment.

First, the self-propelled robot 4 receives the control signal Sc from the information processing device 1 via the communication unit 43 (step S21). Then, the self-propelled robot 4 moves so as to be able to sell commodities to the meeting participants at the sales timing specified by the received control signal Sc (step S22). In this case, when waiting outside the meeting room 3, the self-propelled robot 4 enters the meeting room 3 by the time of the sales timing specified by the control signal Sc at the latest.

Then, the self-propelled robot 4 recommends the commodities to the meeting participants present in the meeting room 3 (step S23). In this case, the self-propelled robot 4 may approaches all the meeting participants present in the meeting room 3 in sequence to prompt them to purchase commodities, or may approach a meeting participant estimated to address the self-propelled robot 4 and then prompt the purchase of commodities. The self-propelled robot 4 may specify a meeting participant performing a predetermined gesture as a sales target, or may specify a meeting participant uttering a predetermined voice as a sales target. Further, the self-propelled robot 4 may estimate the attribute of the meeting participants such as the age based on the output of the sensor unit 44, and recommend commodities according to the estimated attribute.

Further, if the self-propelled robot 4 recognizes, on the basis of the data supplied from the sensor unit 44 or the input unit 40, that the meeting participant has indicated the intention to purchase the commodities, it performs a payment procedure for the purchase of the commodities. In this case, the paying method may be an electronic payment using a short-range wireless communication (NFC) or a two-dimensional bar code, or may be a payment based on biometric certification, or may be a credit card or a cash settlement.

Thereafter, the self-propelled robot 4 transmits the notification signal Si indicating the sales result of the commodities to the information processing device 1 by the communication unit 43 (step S24). In this case, the self-propelled robot 4 may transmit to the information processing device 1 the notification signal Si indicating the result of the commodity recommendation every time it conducts the commodity recommendation at step S23, or may transmit to the information processing device 1 the notification signal Si indicating all sales results of the day at the end of the mobile sales of the day. Thereafter, the self-propelled robot 4 moves to a predetermined standby location (step S25). Further, when the self-propelled robot 4 receives the next control signal Sc from the information processing device 1, it starts the flowchart of FIG. 7 again.

As described above, according to the present example embodiment, since the commodity sales system 100 can perform mobile sales of commodities at an appropriate timing according to the state of activity of each meeting. Accordingly, it is possible to suitably promote the meeting participants to purchase commodities in the meeting room 3. The commodity sales system 100 can provide a trigger to escape the stagnant state by performing the moving sales of commodities during the stagnant state of each meeting, and it can also be expected to activate the state of the meeting.

Further, by performing the mobile sales by the self-propelled robot 4, the commodity sales system 100 can suitably attract attention to the commodities to be sold while reducing the labor cost.

(6) Modification

Next, modifications suitable for the first example embodiment described above will be described. Modifications described below may be applied to the first example embodiment described above in arbitrary combination.

First Modification

The information processing device 1 may instead execute a part of the processing performed by the processor 41 of the self-propelled robot 4. For example, instead of transmitting the control signal Sc indicating the sales timing or the like, the information processing device 1 may transmit to the self-propelled robot 4 the control signal Sc for specifically instructing the operation to be executed by the self-propelled robot 4.

The present modification will be described with reference again to the functional block of FIG. 5. After the determination of the sales timing by the timing determination unit 32, the control unit 33 generates a control signal Sc instructing the operation to be executed by the self-propelled robot 4. In this case, the control unit 33, for example, receives the information generated by the sensor unit 44 of the self-propelled robot 4 and the notification signal Si indicating the information generated by the input unit 40 from the self-propelled robot 4, and recognizes the state of the self-propelled robot 4 and the peripheral state of the self-propelled robot 4. Then, the control unit 33, for example, determines the traveling path of the self-propelled robot 4, and transmits a control signal Sc for traveling the self-propelled robot 4 along the path. In this case, the control unit 33 generates the control signal Sc based on the layout information of the meeting room 3 stored in advance in the storage device 2 and the information generated by the input unit 40 and the sensor unit 44. In another example, the control unit 33 also performs certification processing of the meeting participants based on the output of the sensor unit 44 or the like, and accounting processing at the time of purchase of the commodities.

Even in this modification, the information processing device 1 can cause the self-propelled robot 4 to execute the mobile sales to the meeting room 3 at an appropriate timing in consideration of the state of activity of the meeting.

Second Modification

The self-propelled robot 4 may have one or more functions of the information processing device 1 in substitution for the information processing device 1.

FIG. 8 shows a schematic configuration of a commodity sales system 100A according to the second modification. The commodity sales system 100A includes a storage device 2 and a self-propelled robot 4A. In this case, the self-propelled robot 4A incorporates a processing unit that executes processing to be executed by the information processing device 1 shown in FIG. 1, and performs data communication with the storage device 2 to refer to and update the respective databases of the storage device 2. Further, the self-propelled robot 4A autonomously executes the mobile sales to the meeting participants at a timing in accordance with the state of activity of the meeting in the meeting room 3, by referring to the respective databases of the storage device 2, and the like.

Figure 9:
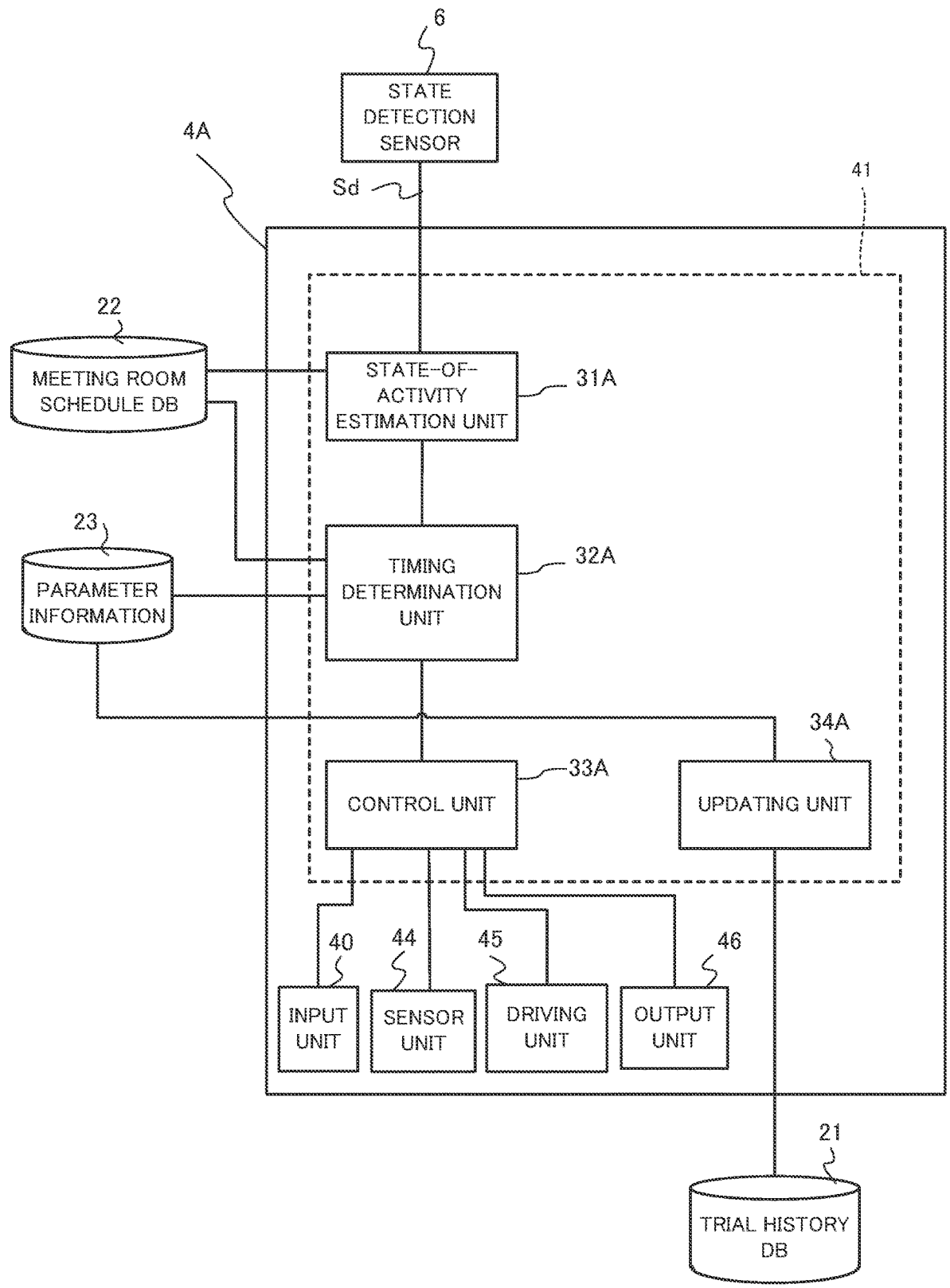
FIG. 9 illustrates a functional block of a processor of a self-propelled robot according to the modification.

FIG. 9 shows a functional block of a processor 41 of a self-propelled robot 4A. The processor 41 functionally includes a state-of-activity estimation unit 31A, a timing determination unit 32A, a control unit 33A, and an updating unit 34A. Here, the state-of-activity estimation unit 31A and the timing determination unit 32A perform the same process as the process executed by the state-of-activity estimation unit 31 and the timing determination unit 32 of the information processing device 1 illustrated in FIG. 5.

The control unit 33A controls the driving unit 45 and the output unit 46 based on the sales timing determined by the determination unit 32A and the information outputted by the input unit 40 and the sensor unit 44. The processing performed by the control unit 33A is the same as the processing performed based on the control signal Sc by the processor 41 of the self-propelled robot 4 in the commodity sales system 100 described above.

The updating unit 34A determines the presence/absence of the commodity sales by detecting the settlement of the commodities, and on the basis of the determination result, it updates the trial history DB 21 in the same manner as the updating unit 34 illustrated in FIG. 5 does. Further, the updating unit 34A updates the parameter information 23 in the same manner as the updating unit 34 does based on the updated trial history DB 21.

Thus, the processor 41 of the self-propelled robot 4A in this modification also functions as the information processing device 1 described above. Then, the self-propelled robot 4A according to the present modification can autonomously execute the mobile sales to the meeting room 3 at a timing in accordance with the state of activity of the meeting without the control by the other devices.

In the second modification, instead of the configuration shown in FIG. 8, the storage device 2 may be incorporated in the self-propelled robot 4A. Further, the commodity sales system 100A may include a master self-propelled robot for controlling other self-propelled robots and one or more slave self-propelled robots which are controlled by the master self-propelled robot. In this case, the master self-propelled robot has functions corresponding to the information processing device 1 (and the storage device 2) in the same way as the self-propelled robot 4A has in the present modification, and transmits the control signal Sc to the slave self-propelled robot. Further, in the same way as the self-propelled robot 4 of the example embodiment does, the slave self-propelled robot performs mobile sales to the meeting room 3 in charge based on the received control signal Sc.

Third Modification

Instead of controlling the self-propelled robot 4, the information processing device 1 may propose or instruct a sales timing to a seller who performs mobile sales of commodities in the meeting room 3.

Figure 10:
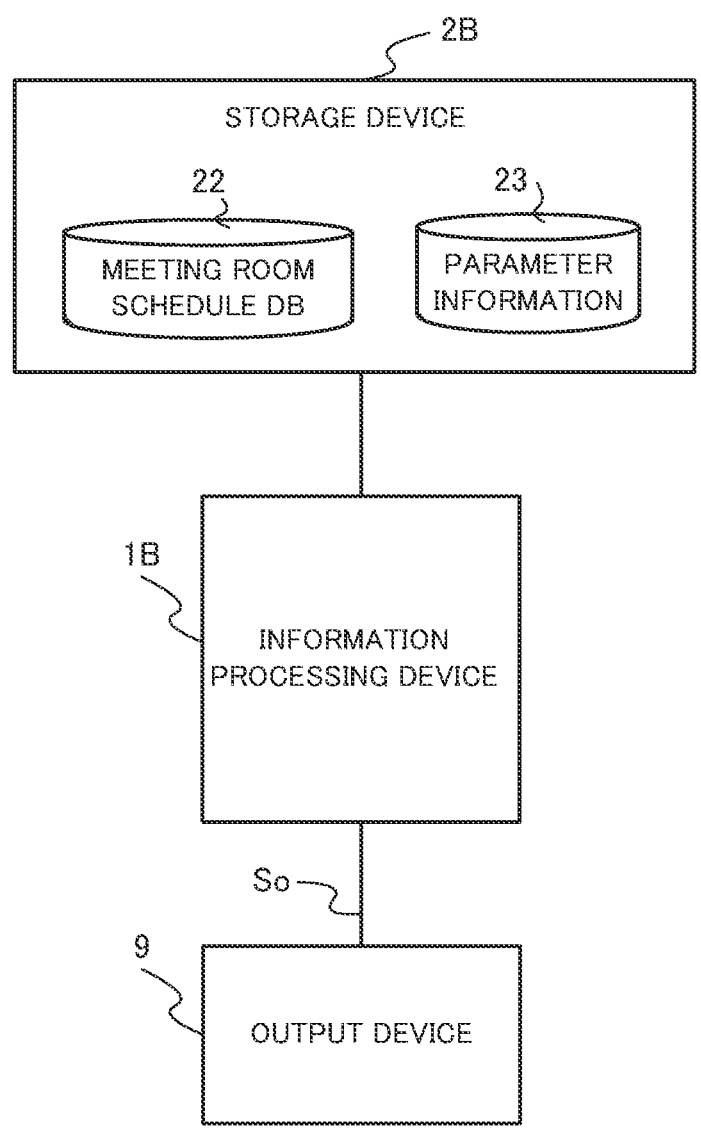
FIG. 10 illustrates a schematic configuration of a commodity sales system according to another modification.

FIG. 10 shows a configuration example of a commodity sales system 100B according to the third modification. The commodity sales system 100B according to the third modification includes an information processing device 1B, a storage device 2B, and an output device 9.

The information processing device 1B determines the sales timing for the meeting room 3 during the meeting by referring to the meeting room schedule DB 22 and the parameter information 23 stored in the storage device 2B. The information processing device 1B supplies an output signal "So" for instructing the output of the determined sales timing and the identification information of the target meeting room 3 to the output device 9.

The output device 9 includes at least one of a display unit such as a display or a sound output unit outputting sound, and performs an output based on the output signal So supplied from the information processing device 1B. In this case, the output device 9 displays or outputs, by audio, information indicating the combination of the target meeting room 3 and the sales timing, based on the output signal So. In this case, the output device 9 may be a portable terminal used by the seller or may be a display or the like installed in the standby station of the seller. In other examples, the output device 9 may be a printer.

Thus, in the present modification, the information processing device 1B can suitably propose or instruct, by the output device 9, the mobile sales to the meeting participant at a timing in accordance with the state of activity of the meeting. Accordingly, the sales person can perform mobile sales to the meeting room 3 at an appropriate timing according to the state of activity of the meeting.

Further, instead of presenting the sales timing to the meeting room 3 by the output device 9, the information processing device 1B may transmit the information equivalent to the output signal So to the communication address such as the mail address used by the seller.

Fourth Modification

The information processing device 1 may estimate the state of activity of the meeting in the meeting room 3 based on, in place of or in addition to the detection signal Sd to be received from the state detection sensor 6, the detection signal outputted by one or more sensors (including the sensor in the device) other than the state detection sensor 6.

In the first example, the information processing device 1 receives at least one of an audio signal generated by a microphone attached to a PC (personal computer) used by the meeting participant in the meeting room 3 or an image signal generated by a camera attached to the PC, via a wireless LAN from the PC. Then, the information processing device 1 estimates the state of activity of the meeting being held in the meeting room 3 based on the signal received from the PC of the meeting participants. In this case, the PC of the meeting participant may process the signal to be transmitted to the information processing device 1 in consideration of the privacy of the meeting participants so that the content during the meeting cannot be grasped when the video or sound is reproduced based on the signal. For example, the PC of the meeting participant transmits to the information processing device 1 a signal obtained by adding a predetermined noise to the signal generated by the attached microphone or/and the camera. In another example, the meeting participant's PC may calculate the sound volume or/and the motion amount from the signal generated by the attached microphone or/and camera and transmit the calculated sound volume and/or the motion amount to the information processing device 1.

In the second example, when the self-propelled robot 4 waits inside the meeting room 3 until the timing of the mobile sales, the information processing device 1 receives the detection signal of the sensor unit 44 provided in the self-propelled robot 4 via a wireless LAN or the like. Then, the information processing device 1 estimates the state of activity of the meeting being held in the meeting room 3 based on the detection signal received from the self-propelled robot 4 during the meeting. In this case, in the same way as the PC of the meeting participant in the first example does, the self-propelled robot 4 may transmit to the information processing device 1 information on the sound volume or/and the motion amount calculated based on the signal outputted by the sensor unit 44 or the processed signal thereof.

Also according to these modes, the information processing device 1 suitably acquires information necessary for estimating the state of activity of the meeting in the meeting room 3, and can estimate the state of activity of the meeting performed in the meeting room 3.

Second Example Embodiment

Figure 11:
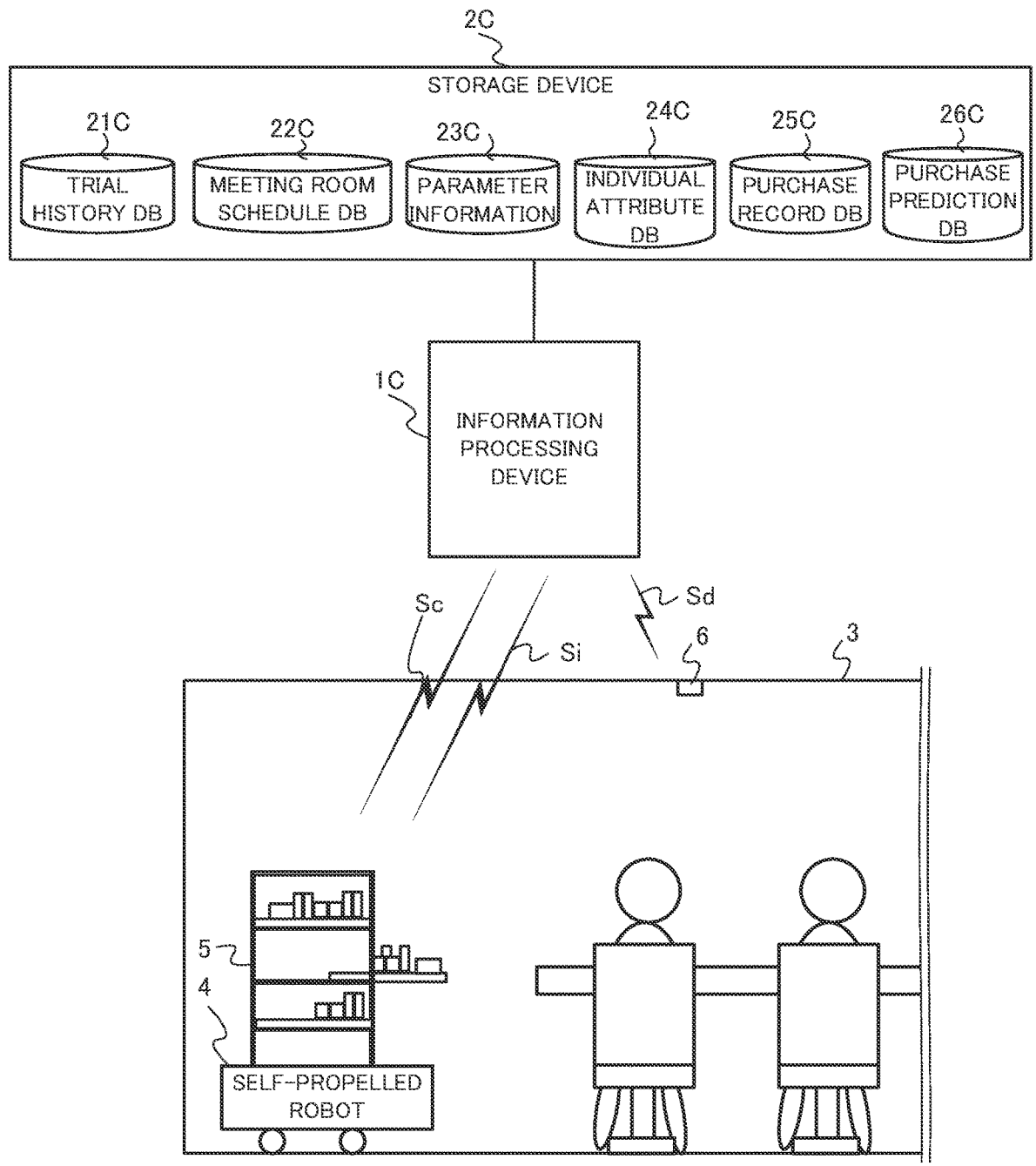
FIG. 11 illustrates a schematic configuration of a commodity sales system according to a second example embodiment.

FIG. 11 shows a schematic configuration of a commodity sales system 100C according to the second example embodiment. The commodity sales system 100C according to the second example embodiment differs from the commodity sales system 100 according to the first example embodiment in that the sales timing of the mobile sales by the mobile robot 4 is determined by further considering the past individual purchase results and individual attributes of the meeting participants. Hereinafter, the same components as in the first example embodiment are denoted by the same reference numerals, and description thereof will be omitted accordingly.

The information processing device 1C has the same configuration as the block configuration shown in FIG. 2A, for example, and determines the sales timing of the mobile sales to the meeting room 3 by the self-propelled robot 4 by further considering the past individual purchase records and individual attributes of the meeting participants, and the like. Details of the processing executed by the information processing device 1C will be described later with reference to FIG. 13.

The storage device 2C has a trial history DB 21C, a meeting room schedule DB 22C, parameter information 23C, an individual attribute DB 24C, a purchase record DB 25C, and a purchase prediction DB 26C. The trial history DB 21C has substantially the same data structure as the trial history DB 21 shown in FIG. 3. The meeting room schedule DB 22C is a database that records the schedule for each meeting room 3, and will be described in detail later. The parameter information 23C indicates the parameters to be used in determining the sales timing as with the parameter information 23.

The individual attribute DB 24C is a database showing the attributes of individuals who can be meeting participants. In the individual attribute DB 24C, each personal ID to identify an individual is associated with various attribute information relating to the individual, such as age, gender, birthday, family structure, and family birthday. The personal ID may be an ID allocated by an organization (company) to which the individual belongs, or may be an ID allocated by a public organization, or may be identification information utilized in biometric certification, such as face certification, iris certification, or fingerprint certification. In the individual attribute DB 24C, the identification information to be used in the biometric authentication may be associated with the personal ID.

The purchase record DB 25C is a data base that shows the historical purchase records of each of the individuals that can be a meeting participant. In the purchase record DB 25C, each personal ID is associated with information on the purchase by each of the individuals such as purchase date and time, purchased commodities, and a purchase location. The purchase record DB 25C may include the sales results of the in-house sales purchased by the meeting participants in association with the employee certificates or the like of the meeting participants that are buyers in the commodity sales system 100. Further, the purchase record DB 25C need not be the purchase information relating to the commodities managed by the manager (management company) of the commodities sales system 100, and may instead include the purchase information relating to the commodities managed by a person or organization other than the above-mentioned manager. For example, the purchase record DB 25C may include purchase record data collected by major retailers.

The purchase prediction DB 26C is a database that shows the purchase tendencies of individuals who can be meeting participants. In the purchase prediction DB 26C, each personal ID described above is associated with the identification information of commodities (which may be a category of the commodities) that the individual tends to purchase and the timing of the tendency to purchase the commodities.

FIG. 12 is an example of the data structure of the meeting room schedule DB 22C. As shown in FIG. 12, the meeting room schedule DB 22C includes the reservation information for each meeting room 3, and each item of the reservation information include not only sub-items "TIME SLOT" indicating the reservation time slot and "NUMBER OF PARTICIPANTS" indicating the expected number of participants in the meeting but also sub-items "PARTICIPANT ID" indicating the personal ID of each meeting participant. It is noted that the sub-items "PARTICIPANT ID" are provided for the number of participants specified by "NUMBER OF PARTICIPANTS". In this way, the meeting room schedule DB 22C includes information indicative of the number of participants and the meeting participants for each scheduled meeting.

Figure 13:
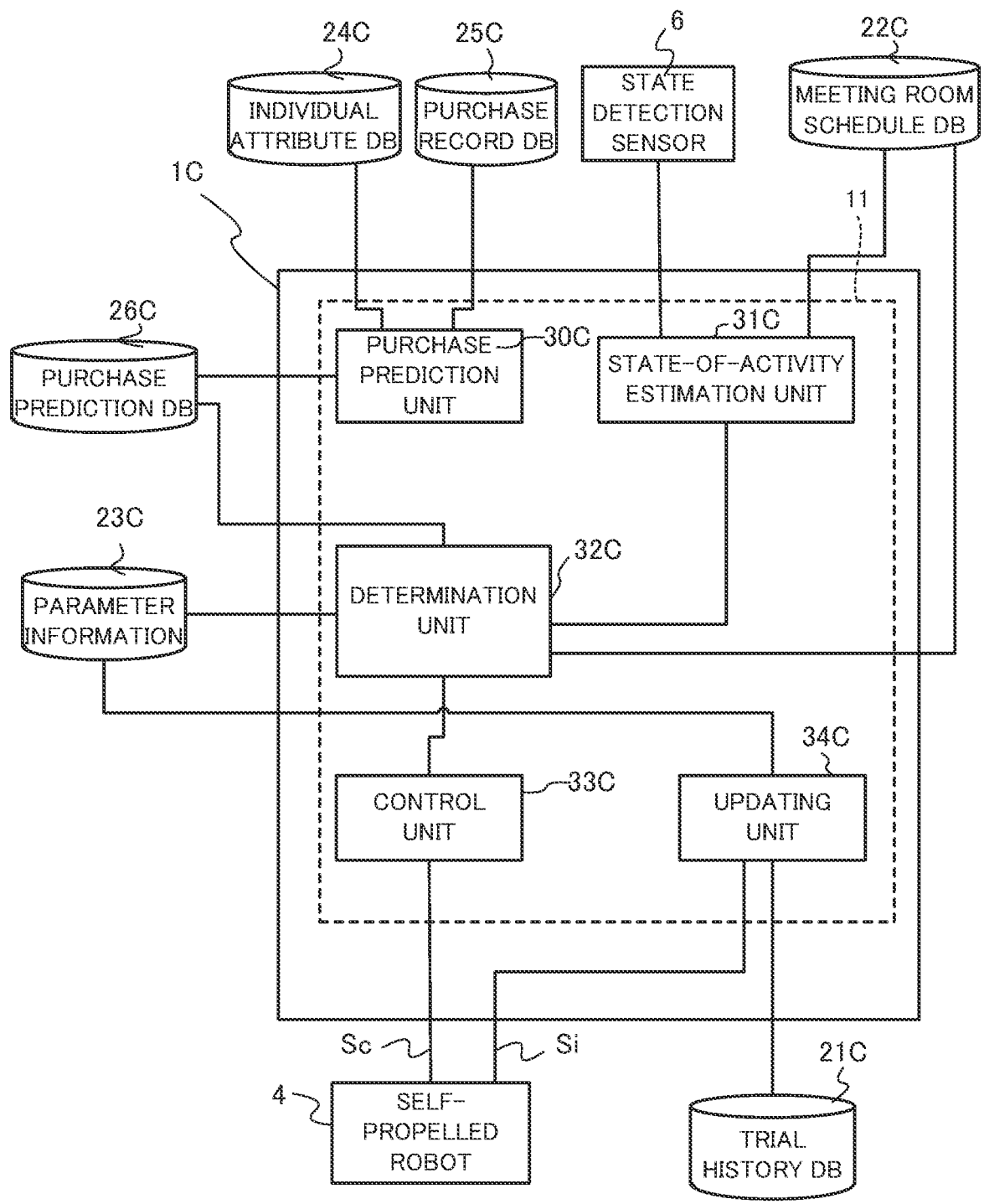
FIG. 13 illustrates a functional block diagram of the processor of the information processing device according to the second example embodiment.

FIG. 13 shows a functional block diagram of the processor 11 of the information processing device 1C. As shown in FIG. 13, the processor 11 functionally includes a purchase prediction unit 30C, a state-of-activity estimation unit 31C, a determination unit 32C, a control unit 33C, and an updating unit 34C. The state-of-activity estimation unit 31C and the updating unit 34C perform the same process as the state-of-activity estimation unit 31 and the updating unit 34 do in FIG. 5, respectively.

The purchase prediction unit 30C predicts the purchase by every individual based on the individual attribute DB 24C and the purchase record DB 25C, and registers the prediction result in the purchase prediction DB 26C. In this instance, the purchase prediction unit 30C may make a purchase prediction for meeting participants based on various predicting and analytical techniques. For example, the purchase forecasting unit 30C uses a prediction analysis automation technique that automates a series of process from the extraction/design of data items (feature quantities) valid for the analysis of the individual attribute DB 24C and the purchase record DB 25C to the creation of an optimal prediction model for purchase commodities and the purchase timing. As a software for performing such predictive analytical automation, for example, there is dotData (registered trademark) or the like. In another example, the purchase forecasting unit 30C may analyze the purchase commodities and the purchase timing for each meeting participant based on the heterogeneous mixture learning technique, which is an analytical technique that automatically discovers a large number of regularities mixed in the big data. In yet another example, the purchase prediction unit 30C may use a customer analysis technique which automatically extracts groups having strong relationships between meeting participants and commodities from the purchase record DB 25C, etc., and which determines the commodities and the purchase timing that each meeting participant tends to purchase based on the features of each extracted group.

By referring to the meeting room schedule DB 22C, the determination unit 32C acquires the number of participants and participant IDs of the meeting in the target meeting room 3 and acquires the purchase tendency (trend) regarding the purchase commodities and the purchase timing which are linked to the acquired participant IDs (individual IDs) in the purchase prediction DB 26C. Then, the determination unit 32C determines commodities (also referred to as "recommended commodities") to be recommended to the respective participants based on the tendency of commodities purchased by the respective meeting participants obtained from the purchase prediction DB 26C.

In addition, the determination unit 32C determines the sales timing based on: the tendency of the timing at which each meeting participant purchases based on the purchase prediction DB 26C; the state of activity estimated by the state-of-activity estimation unit 31C; the number of participants in the meeting; and the meeting elapsed time.

In this case, for example, the determination unit 32C determines the first sales timing, which is the same sales timing as the sales timing according to the first example embodiment, based on the estimated state of activity, the number of participants in the meeting, and the meeting elapsed time. In addition, if there is a meeting participant with a tendency of the purchase timing related to the time slot of the meeting, the determination unit 32C determines the second sales timing based on the tendency of the purchase timing of the meeting participant. For example, in a meeting held between 14 o'clock and 16 o'clock, if there is a meeting participant with a tendency of purchasing a drink at 15 o'clock, the determination unit 32C determines the second sales timing to be 15 o'clock. Then, the determination unit 32C determines the sales timing of the mobile sales between the first sales timing and the second sales timing by performing a predetermined weighting between the first sales timing and the second sales timing. The respective weighting information for the first sales timing and the second sales timing in this case is predetermined, for example, and is stored in the storage device 2C or the memory 12. When there are more than one meeting participants who each has a tendency of purchase timing related to the time slot of the meeting, the determination unit 32C determines the second sale timing considering the tendency of purchase timing of each of the meeting participants.

The control unit 33C generates a control signal Sc that specifies the recommended commodities and the sales timing of the mobile sales for each participant in the meeting room 3, and transmits the control signal Sc to the self-propelled robot 4. In this case, the self-propelled robot 4 performs the mobile sales to the meeting room 3 at the sales timing specified by the control signal Sc. At this time, the self-propelled robot 4 identifies each meeting participant in the meeting room 3 by biometric authentication such as face authentication, iris authentication, and fingerprint authentication based on the output by the sensor unit 44, and recommends the recommended commodities specified by the control signal Sc to each meeting participant. The above-described biometric authentication is not limited to the above example, and it may be any biometric authentication using information of a human body characteristic (biological organ) or a behavior characteristic (habit). Such biometric certification also includes anthropomorphic certification based on the human body shape (body size). Examples of the recommendation approach include: passing through the vicinity of the meeting participants; decelerating in the vicinity of the meeting participants; stopping for a predetermined time in the vicinity of the meeting participants; putting a recommended commodities in the front; displaying or outputting, by audio, information prompting purchase of recommended commodities; lighting a lamp; and any combination thereof.

As described above, in the second example embodiment, the commodity sales system 100C determines the sales timing for performing the mobile sales to the meeting room 3 in consideration of the purchase tendency of the meeting participants. Thereby, it is possible to determine the optimum sales timing for each combination of the meeting participants. In addition, the commodity sales system 100C can suitably prompt the meeting participants to purchase commodities by determining recommended commodities for each meeting participant based on the purchase tendency of each meeting participant and recommending the recommended commodities.

Third Example Embodiment

Figure 14:
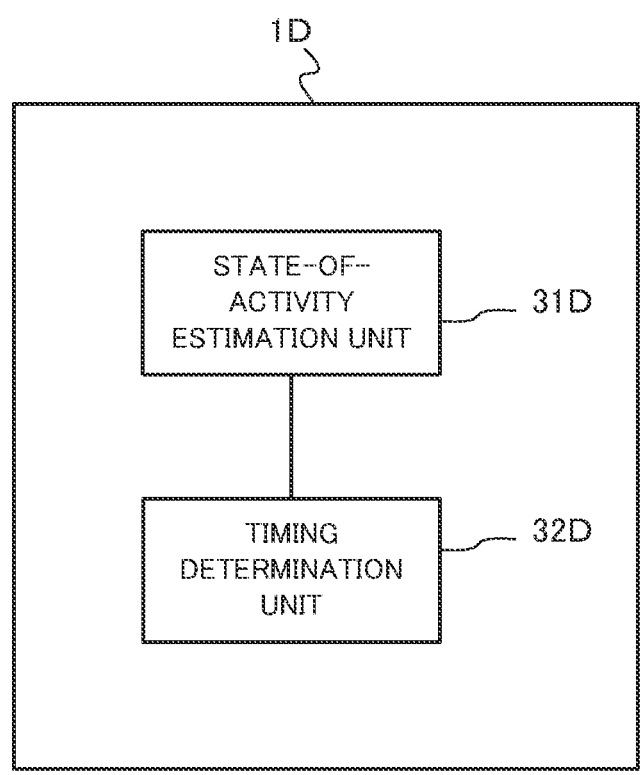
FIG. 14 illustrates a schematic configuration of the information processing device according to a third example embodiment.

FIG. 14 is a schematic configuration diagram of an information processing device 1D according to a third example embodiment. As shown in FIG. 14, the information processing device 1D mainly includes a state-of-activity estimation unit 31D and a timing determination unit 32D.

The state-of-activity estimation unit 31D estimates, based on information detected in a meeting room in which a meeting is being held, a state of activity of the meeting. The detected information described above corresponds to, for example, a detection signal Sd outputted by the state detection sensor 6 according to the first example embodiment or the second example embodiment or a signal outputted by a sensor attached to a PC of a meeting participant or a self-propelled robot 4 according to the fourth modification of the first example embodiment. For example, the state-of-activity estimation unit 31D is realized by any one of the state-of-activity estimation unit 31 of the first example embodiment, the state-of-activity estimation unit 31A of the second modification of the first example embodiment, and the state-of-activity estimation unit 31C of the second example embodiment.

The timing determination unit 32D determines a timing of mobile sales of a commodity to one or more participants of the meeting based on the state of activity estimated by the state-of-activity estimating unit 31D. The timing determination unit 32D is realized by any one of the timing determination unit 32 of the first example embodiment, the timing determination unit 32A of the second modification of the first example embodiment, and the determination unit 32C of the second example embodiment.

According to the configuration of the third example embodiment, the information processing device 1D can determine the timing of the mobile sales for the meeting room in which the meeting is being held, based on the state of activity of the meeting.

The whole or a part of the example embodiments described above can be described as, but not limited to, the following Supplementary Notes.

[Supplementary Note 1]

An information processing device comprising:
  a state-of-activity estimation unit configured to estimate, based on information detected in a meeting room in which a meeting is being held, a state of activity of the meeting; and a timing determination unit configured to determine a timing of mobile sales of a commodity to one or more participants of the meeting based on the state of activity.

[Supplementary Note 2]

The information processing device according to Supplementary Note 1,
wherein the timing determination unit determines the timing based on
the state of activity and
at least one of the number of participants or an elapsed time of the meeting.

[Supplementary Note 3]

The information processing device according to Supplementary Note 1 or 2,
wherein the state-of-activity estimation unit estimates the state of activity based on at least one of a motion or a voice amount of the participants specified based on the information.

[Supplementary Note 4]

The information processing device according to any one of Supplementary Notes 1 to 3,
wherein the timing determination unit determines the timing of the mobile sales to be a timing at which the state of activity is estimated to be a stagnant state.

[Supplementary Note 5]

The information processing device according to Supplementary Note 4,
wherein the timing determination unit determines, in a case where the state of activity becomes a precursor state of the stagnant state, the timing of the mobile sales to be after a lapse of a predetermined time from the precursor state.

[Supplementary Note 6]

The information processing device according to any one of Supplementary Notes 1 to 5, further comprising
a control unit configured to transmit a control signal for instructing a self-propelled robot with the commodity to perform the mobile sales to the meeting room at the timing.

[Supplementary Note 7]

The information processing device according to any one of Supplementary Notes 1 to 5,
wherein the information processing device is built in a self-propelled robot with the commodity, the information processing device further comprising
a control unit configured to generate a control signal for controlling the self-propelled robot so as to perform the mobile sales to the meeting room at the timing.

[Supplementary Note 8]

The information processing device according to Supplementary Note 6 or 7,
wherein the self-propelled robot recognizes a person present in the meeting room based on an output of a sensor and sells the commodity to the person.

[Supplementary Note 9]

The information processing device according to any one of Supplementary Notes 1 to 8, further comprising
a prediction unit configured to predict a purchase tendency of each of the participants, based on at least one of purchase record information or individual attribute information, the purchase record information indicating purchase records including purchase date and time by the participants, the individual attribute information relating to attributes of the participants.

[Supplementary Note 10]

The information processing device according to any one of Supplementary Notes 1 to 9,
wherein the timing determination unit determines the timing, based on the state of activity and a result of the mobile sales performed in a past.

[Supplementary Note 11]

The information processing device according to Supplementary Note 10,
wherein the result of the mobile sales includes information indicating changes in the state of activity before and after the mobile sales, and
wherein the timing determination unit determines, based on the state of activity and information indicating changes in the state of activity before and after the mobile sales, the timing of the mobile sales to be a timing at which the meeting is likely to be activated.

[Supplementary Note 12]

The information processing device according to Supplementary Note 10,
wherein the result of the mobile sales includes information indicating presence/absence of commodity purchase by the mobile sales, and
wherein the timing determination unit determines, based on the state of activity and information indicating the presence/absence of the commodity purchase by the mobile sales, the timing of the mobile sales to be a timing at which the commodity purchase tends to be performed.

[Supplementary Note 13]

A control method executed by an information processing device, the control method comprising:
estimating, based on information detected in a meeting room in which a meeting is being held, a state of activity of the meeting; and
determining a timing of mobile sales of a commodity to one or more participants of the meeting based on the state of activity.

[Supplementary Note 14]

A storage medium storing a program executed by a computer, the program causing the computer to function as:
a state-of-activity estimation unit configured to estimate, based on information detected in a meeting room in which a meeting is being held, a state of activity of the meeting; and
a timing determination unit configured to determine a timing of mobile sales of a commodity to one or more participants of the meeting based on the state of activity.

While the invention has been particularly shown and described with reference to example embodiments thereof, the invention is not limited to these example embodiments. It will be understood by those of ordinary skilled in the art that various changes in form and details may be made therein without departing from the spirit and scope of the present invention as defined by the claims. In other words, it is needless to say that the present invention includes various modifications that could be made by a person skilled in the art according to the entire disclosure including the scope of the claims, and the technical philosophy. All Patent and Non-Patent Literatures mentioned in this specification are incorporated by reference in its entirety.

| DESCRIPTION OF REFERENCE NUMERALS | |
|---|---|
| 1, 1A to 1D | Information processing device |
| 2, 2B, 2C | Storage device |
| 3 | Meeting room |
| 4, 4A | Self-propelled robot |
| 5 | Commodity holding unit |
| 9 | Output device |
| 100, 100A to 100C | Commodity sales system |

What is claimed is:

1. An information processing device comprising:
   at least one memory storing instructions; and
   at least one processor configured to execute the instructions to:
   estimate, based on information detected in a meeting room in which a meeting is being held, a state of activity of the meeting;
   determine a timing of mobile sales of a commodity to one or more of participants of the meeting based on the state of activity, and based on at least one of the number of the participants in the meeting or an elapsed time of the meeting; and
   transmit a control signal for instructing a self-propelled robot with a commodity to perform the mobile sales to the meeting room at the timing,
   wherein the self-propelled robot recognizes a person present in the meeting room based on an output of a sensor and sells the commodity to the person.

2. The information processing device according to claim 1,
   wherein the at least one processor is configured to execute the instructions to estimate the state of activity based on at least one of a motion or a voice amount of the participants specified based on the information.

3. The information processing device according to claim 1,
   wherein the at least one processor is configured to execute the instructions to determine the timing of the mobile sales to be a timing at which the state of activity is estimated to be a stagnant state.

4. The information processing device according to claim 3,
   wherein the at least one processor is configured to execute the instructions to determine, in a case where the state of activity becomes a precursor state of the stagnant state, the timing of the mobile sales to be after a lapse of a predetermined time from the precursor state.

5. The information processing device according to claim 1,
   wherein the information processing device is built in the self-propelled robot with the commodity, and
   wherein the at least one processor is configured to execute the instructions to generate the control signal for controlling the self-propelled robot so as to perform the mobile sales to the meeting room at the timing.

6. The information processing device according to claim 1,
   wherein the at least one processor is configured to execute the instructions to predict a purchase tendency of each of the participants, based on at least one of purchase record information or individual attribute information, the purchase record information indicating purchase records including purchase date and time by the participants, the individual attribute information relating to attributes of the participants.

7. The information processing device according to claim 1,
   wherein the at least one processor is configured to execute the instructions to determine the timing, based on the state of activity and a result of mobile sales performed in a past.

8. The information processing device according to claim 7,
   wherein the result of the mobile sales includes information indicating changes in the state of activity before and after the mobile sales, and
   wherein the at least one processor is configured to execute the instructions to determine, based on the state of activity and the information indicating the changes in the state of activity before and after the mobile sales, the timing of the mobile sales to be a timing at which the meeting is likely to be activated.

9. The information processing device according to claim 7,
   wherein the result of the mobile sales includes information indicating presence/absence of commodity purchase by the mobile sales, and
   wherein the at least one processor is configured to execute the instructions to determine, based on the state of activity and information indicating the presence/absence of the commodity purchase by the mobile sales, the timing of the mobile sales to be a timing at which the commodity purchase tends to be performed.

10. A control method executed by an information processing device and comprising:
    estimating, based on information detected in a meeting room in which a meeting is being held, a state of activity of the meeting;
    determining a timing of mobile sales of a commodity to one or more of participants of the meeting based on the state of activity, and based on at least one of the number of the participants in the meeting or an elapsed time of the meeting; and
    transmitting a control signal for instructing a self-propelled robot with a commodity to perform the mobile sales to the meeting room at the timing,
    wherein the self-propelled robot recognizes a person present in the meeting room based on an output of a sensor and sells the commodity to the person.

11. A non-transitory computer readable storage medium storing a program executable by a computer to:
    estimate, based on information detected in a meeting room in which a meeting is being held, a state of activity of the meeting;
    determine a timing of mobile sales of a commodity to one or more of participants of the meeting based on the state of activity, and based on at least one of the number of the participants in the meeting or an elapsed time of the meeting; and
    transmit a control signal for instructing a self-propelled robot with a commodity to perform the mobile sales to the meeting room at the timing,
    wherein the self-propelled robot recognizes a person present in the meeting room based on an output of a sensor and sells the commodity to the person.

* * * * *